(12) United States Patent
Tamada et al.

(10) Patent No.: US 8,915,536 B2
(45) Date of Patent: Dec. 23, 2014

(54) IMPACT ABSORBING MEMBER AND METHOD OF MANUFACTURING THE SAME

(71) Applicant: Kyoraku Co., Ltd., Kyoto (JP)

(72) Inventors: Teruo Tamada, Yamato (JP); Seiji Oono, Yamato (JP)

(73) Assignee: Kyoraku Co., Ltd., Kyoto (JP)

( * ) Notice: Subject to any disclaimer, the term of this patent is extended or adjusted under 35 U.S.C. 154(b) by 0 days.

(21) Appl. No.: 13/693,622

(22) Filed: Dec. 4, 2012

(65) Prior Publication Data

US 2013/0154307 A1 Jun. 20, 2013

Related U.S. Application Data

(63) Continuation of application No. 13/686,063, filed on Nov. 27, 2012, which is a continuation of application No. PCT/JP2011/062206, filed on May 27, 2011.

(30) Foreign Application Priority Data

| May 28, 2010 | (JP) | 2010-003620 U |
| May 28, 2010 | (JP) | 2010-123536 |
| May 28, 2010 | (JP) | 2010-123557 |

(51) Int. Cl.
*B60J 7/00* (2006.01)
*B60R 19/34* (2006.01)
*B60R 21/04* (2006.01)

(52) U.S. Cl.
CPC ............... *B60R 19/34* (2013.01); *B60R 21/04* (2013.01); *B60R 21/0428* (2013.01); *B60R 2021/0414* (2013.01)
USPC .................................... 296/187.05

(58) Field of Classification Search
CPC B60R 21/04; B60R 19/18; B60R 2021/0414; B60R 21/0428; B60R 2021/0435; B62D 21/152
USPC ............ 296/187.05; 188/377; 280/751; 267/140; 293/1, 102, 133
See application file for complete search history.

(56) References Cited

U.S. PATENT DOCUMENTS 3,871,636 A * 3/1975 Boyle ............................ 267/140
3,997,207 A * 12/1976 Norlin ........................... 293/110

(Continued)

FOREIGN PATENT DOCUMENTS

| AU | 7104601 A | 1/2002 |
| AU | 2002344847 B2 | 1/2003 |

(Continued)

OTHER PUBLICATIONS

United States Office Action dated Oct. 20, 2014, which issued during prosecution of U.S. Appl. No. 13/686,063, which is related to the present application.

*Primary Examiner* — Kiran B Patel
(74) *Attorney, Agent, or Firm* — Troutman Sanders LLP

(57) ABSTRACT

An impact absorbing member includes a hollow body having a plurality of ribs, and the hollow body includes a low rib density portion being a portion where density of the ribs is low, and a high rib density portion being a portion where density of the ribs is high. The hollow body may include a thin portion and a thick portion. In this case, the rib density of the thin portion and the rib density of the thick portion may be different from each other

4 Claims, 16 Drawing Sheets

(56) References Cited

U.S. PATENT DOCUMENTS

| | | | |
|---|---|---|---|
| 4,515,248 A | 5/1985 | Ohta | |
| 5,433,478 A * | 7/1995 | Naruse | 280/751 |
| 5,636,866 A * | 6/1997 | Suzuki et al. | 280/748 |
| 5,762,392 A * | 6/1998 | Suga | 296/39.1 |
| 5,857,702 A | 1/1999 | Suga et al. | |
| 5,925,435 A * | 7/1999 | Togawa et al. | 428/120 |
| 6,050,631 A * | 4/2000 | Suzuki et al. | 296/187.05 |
| 6,126,231 A * | 10/2000 | Suzuki et al. | 296/187.05 |
| 6,406,079 B2 * | 6/2002 | Tamada et al. | 293/120 |
| 6,443,513 B1 * | 9/2002 | Glance | 293/133 |
| 6,682,128 B2 | 1/2004 | Carroll, III et al. | |
| 6,719,321 B2 * | 4/2004 | Yasuhara et al. | 280/730.2 |
| 6,729,451 B2 * | 5/2004 | Yamagiwa | 188/377 |
| 7,111,713 B2 | 9/2006 | Tamada et al. | |
| 7,143,876 B2 | 12/2006 | Tamada et al. | |
| 7,178,647 B2 | 2/2007 | Tamada et al. | |
| 7,306,080 B2 | 12/2007 | Tamada | |
| 7,306,081 B2 | 12/2007 | Tamada et al. | |
| 7,354,030 B2 * | 4/2008 | Murayama et al. | 267/140 |
| 7,370,893 B2 * | 5/2008 | Tamada et al. | 293/120 |
| 7,377,577 B2 * | 5/2008 | Carroll et al. | 296/187.03 |
| 7,404,593 B2 * | 7/2008 | Cormier et al. | 296/187.03 |
| 7,513,528 B2 * | 4/2009 | Penner | 280/752 |
| 7,618,082 B2 | 11/2009 | Tamada | |
| 7,625,023 B2 * | 12/2009 | Audi et al. | 293/134 |
| 7,677,640 B2 * | 3/2010 | Dix et al. | 296/146.7 |
| 7,762,375 B2 * | 7/2010 | Matsuyama et al. | 181/290 |
| 8,016,344 B2 * | 9/2011 | Tamada | 296/187.03 |
| 8,029,041 B2 * | 10/2011 | Hall et al. | 296/146.6 |
| 8,118,347 B2 | 2/2012 | Kawashima et al. | |
| 8,215,699 B2 * | 7/2012 | Suzuki et al. | 296/146.7 |
| 8,383,242 B2 * | 2/2013 | Malek et al. | 428/458 |
| 8,439,400 B2 | 5/2013 | Suzuki et al. | |
| 8,443,950 B2 * | 5/2013 | Tamada | 188/371 |
| 8,454,053 B2 * | 6/2013 | Sun et al. | 280/752 |
| 2001/0018104 A1 * | 8/2001 | Iwasaki | 428/36.9 |
| 2002/0005644 A1 | 1/2002 | Tamada et al. | |
| 2002/0017805 A1 | 2/2002 | Carroll, III et al. | |
| 2002/0145298 A1 * | 10/2002 | Williams et al. | 296/39.1 |
| 2003/0071388 A1 * | 4/2003 | Iwasaki | 264/85 |
| 2003/0072902 A1 | 4/2003 | Iwasaki | |
| 2004/0028478 A1 * | 2/2004 | Lekhtman | 405/219 |
| 2004/0124572 A1 | 7/2004 | Tamada et al. | |
| 2004/0129518 A1 * | 7/2004 | Tamada et al. | 188/377 |
| 2004/0195064 A1 * | 10/2004 | Tamada et al. | 188/371 |
| 2005/0230204 A1 * | 10/2005 | Tamada et al. | 188/371 |
| 2006/0076202 A1 * | 4/2006 | Tamada et al. | 188/371 |
| 2006/0220290 A1 * | 10/2006 | Tamada et al. | 267/152 |
| 2006/0255601 A1 | 11/2006 | Tamada et al. | |
| 2007/0210615 A1 * | 9/2007 | Tamada | 296/187.03 |
| 2008/0203749 A1 | 8/2008 | Tamada | |
| 2008/0296164 A1 * | 12/2008 | Dajek et al. | 205/80 |
| 2009/0045613 A1 * | 2/2009 | Baldwin | 280/750 |
| 2009/0152881 A1 * | 6/2009 | Shin | 293/102 |
| 2010/0140032 A1 | 6/2010 | Tamada | |
| 2010/0173125 A1 * | 7/2010 | Malek et al. | 428/138 |
| 2011/0315311 A1 | 12/2011 | Ishida et al. | |
| 2012/0080872 A1 | 4/2012 | Suzuki et al. | |
| 2012/0235443 A1 * | 9/2012 | Tamada | 296/187.05 |
| 2013/0154286 A1 * | 6/2013 | Tamada et al. | 293/133 |
| 2014/0048367 A1 | 2/2014 | Tani et al. | |
| 2014/0124989 A1 | 5/2014 | Tani et al. | |

FOREIGN PATENT DOCUMENTS

| | | |
|---|---|---|
| CA | 2504485 A1 | 5/2004 |
| EP | 1129839 A2 | 9/2001 |
| EP | 1172260 A2 | 1/2002 |
| EP | 1404549 A2 | 4/2004 |
| EP | 1557582 A1 | 7/2005 |
| EP | 1404549 A4 | 10/2005 |
| JP | 678036 U | 11/1994 |
| JP | 200229341 A | 1/2002 |
| JP | 2002187508 A | 7/2002 |
| JP | 2002193057 A | 7/2002 |
| JP | 2004-149075 A | 5/2004 |
| JP | 200912765 A | 1/2009 |
| JP | 200923521 A | 2/2009 |
| JP | 2009161028 A | 7/2009 |
| JP | 2009257584 A | 11/2009 |
| JP | 20106195 A | 1/2010 |
| JP | 201052533 A | 3/2010 |
| JP | 2010107027 A | 5/2010 |
| WO | 02102460 A2 | 12/2002 |
| WO | 02102460 A3 | 12/2002 |

* cited by examiner

IMPACT ABSORBING MEMBER AND METHOD OF MANUFACTURING THE SAME

CROSS-REFERENCE TO RELATED APPLICATION

This application is a continuation of U.S. patent application Ser. No. 13/686,063, filed Nov. 27, 2012, which is a continuation of PCT International Application No. PCT/JP2011/062206 filed on May 27, 2011, which, in turn, claims priority from JP Patent Application No. 2010-123536 filed May 28, 2010, JP Patent Application No. 2010-123557, filed May 28, 2010, and JP Patent Application No. 2010-003620 U, filed May 28, 2010. The entire content of all of the above-listed related applications is hereby incorporated by reference.

BACKGROUND

1. Technical Field

The present disclosure relates to an impact absorbing member that cushions and/or absorbs impact at the time of collision, and a method of manufacturing the impact absorbing member.

2. Related Art

An impact absorbing member that absorbs impact includes, for example, an impact absorbing member with hollow wall structure. The impact absorbing member with hollow wall structure can be obtained, for example, by blow-molding thermoplastic resin. This type of impact absorbing member is, for example, provided between a door panel and a door trim to protect an occupant from impact from the side.

An impact absorbing member disclosed in JP-A-2002-29341 includes a number of recessed ribs that connect a front surface wall and a back surface wall.

SUMMARY

An impact absorbing member includes a hollow body having a plurality of ribs, and the hollow body includes a low rib density portion being a portion where density of the ribs is low and a high rib density portion being a portion where density of the ribs is high.

DETAILED DESCRIPTION

Figure 1A:
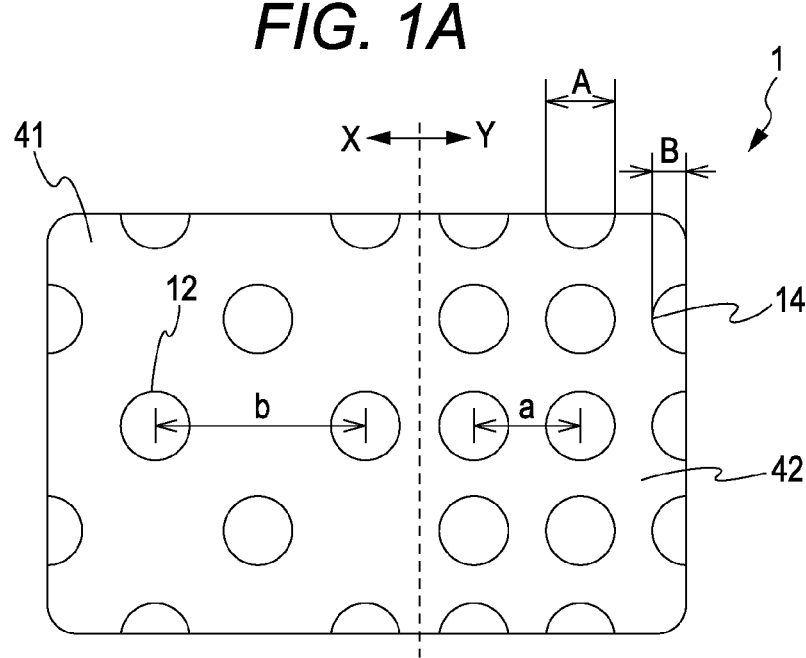
FIG. 1A is a plan view of an impact absorbing member according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A known impact absorbing member obtained by blow-molding is formed under the assumption that a waist or chest dummy hits against the entire impact absorbing member. However, in recent years, due to changes in test conditions, the impact absorbing member is required to include two or more portions having different impact absorbing performance. In blow-molding, the impact absorbing performance of the impact absorbing member is usually controlled by changing its thickness. However, it is difficult to accurately set the thickness of the impact absorbing member to a predetermined value at the time of molding. There is also a limit to a range that can change the thickness.

An impact absorbing member including a number of recessed ribs is disclosed in JP-A-2002-29341. If impact is concentrated on a part (e.g., one recessed rib), only the periphery of the recessed rib is strained, and even this impact absorbing member may not absorb the impact effectively.

In addition, restriction is imposed on the shape, the thickness, and the like of space where the impact absorbing member is provided. Therefore, there is also restriction on the thickness of the impact absorbing member itself, the arrangement of ribs, and the like. As a result, the impact absorbing performance of the impact absorbing member may be different for different portions. Therefore, impact may not be absorbed effectively.

An object of the present disclosure is to provide a blow-molded impact absorbing member including two or more portions having different impact absorbing performance. Furthermore, another object of the present disclosure is to provide a method of manufacturing the impact absorbing member.

Still another object of the present disclosure is to provide an impact absorbing member that can absorb impact effectively even when impact is concentrated on a part, or restriction is imposed on the shape of the impact absorbing member. Furthermore, still another object of the present disclosure is to provide a method of manufacturing the impact absorbing member.

An impact absorbing member according to the present disclosure includes a hollow body having a plurality of ribs, and the hollow body includes a low rib density portion being a portion where density of the ribs is low and a high rib density portion being a portion where density of the ribs is high.

Moreover, a method of manufacturing this impact absorbing member includes: disposing parison between a pair of split mold blocks each having a rib forming cavity; clamping the mold blocks; fitting the parison along the cavities of the mold blocks by introducing pressurized air; and cooling the parison.

Furthermore, another impact absorbing member according to the present disclosure includes: a hollow body having a plurality of ribs; and a plate member provided on an impact absorbing surface of the hollow body so as to cover at least two or more ribs.

Moreover, a method of manufacturing this impact absorbing member includes: placing the plate member on a cavity surface of one of a pair of split mold blocks; disposing parison between the one split mold block and the other split mold block having a rib forming cavity; clamping the split mold blocks; and fitting the parison along the cavity surface by introducing pressurized air.

According to the present disclosure, it is possible to provide a blow-molded impact absorbing member including a two or more portions having different impact absorbing performance. Furthermore, it is possible to provide a method of manufacturing the impact absorbing member.

According to the present disclosure, it is possible to provide an impact absorbing member that can absorb impact effectively even when impact is concentrated on a part, or restriction is imposed on the shape of the impact absorbing member. Furthermore, it is possible to provide a method of manufacturing the impact absorbing member.

(First Embodiment)

A first embodiment of the present disclosure will be described with reference to FIGS. 1A and 1B.

An impact absorbing member 1 according to the present embodiment includes a hollow body 11. Substantially the entire surface of the hollow body 11 is substantially uniform in thickness. The hollow body 11 includes a hollow portion 2, a peripheral wall surface (or side wall) 3, a first wall 4, and a second wall 5. The first wall 4 of the hollow body 11 includes a plurality of recessed ribs 6. The recessed rib 6 is a portion recessed into the second wall 5. The second wall 5 includes a plurality of recessed ribs 7. The recessed rib 7 is a portion recessed into the first wall 4. The recessed rib 6 and the recessed rib 7 are provided so as to face each other. A bottom portion of the recessed rib 6 and a bottom portion of the recessed rib 7 are welded to each other at substantially a middle position between the first wall 4 and the second wall 5. Therefore, the bottom portions of the recessed ribs 6 and 7 are integrated to form a welded plate-shaped portion 8.

Moreover, the recessed ribs 6 and 7 have substantially circular cross-sections. The recessed rib 6 includes an opening end 12 at the first wall 4. The recessed rib 7 includes an opening end 13 at the second wall 5. The recessed ribs 6 and 7 have the inner diameters that decrease from the opening ends 12 and 13, respectively, toward the welded plate-shaped portion 8. The angle α of the decreasing diameter is within a range of 5 to 30°. The diameter A of the opening ends 12 and 13 is within a range of 10 to 40 mm. If the recessed ribs 6 and 7 are formed to satisfy the numerical value ranges, the central positions of the recessed ribs 6 and 7 are bent into a "<" shape when the impact absorbing member 1 receives impact. An experiment has confirmed that such a configuration leads to the highest cushioning effect of the hollow body 11 on the impact received by the impact absorbing member 1. The recessed ribs 6 and 7 may have oblong cross-sections.

A plurality of rib-shaped portions 15 is formed at appropriate intervals on the peripheral wall surface 3 (side wall) of the hollow body 11. The rib-shaped portion 15 is formed by recessing a part of the peripheral wall surface 3 into the hollow portion 2 side (inward). The rib-shaped portion 15 has an opening end 14 at the first wall 4 or the second wall 5. The rib-shaped portion 15 has substantially semicircular cross-section. The rib-shaped portion 15 has the inner diameter that decreases from the opening end 14 toward the hollow portion 2 of the hollow body 11. The angle α of the decreasing diameter is within a range of 5 to 30°. The radius B of the opening end 14 is within a range of 5 to 20 mm.

The rib-shaped portion 15 on the first wall 4 side and the rib-shaped portion 15 on the second wall 5 side are welded to each other at substantially a middle position between the first wall 4 and the second wall 5. Therefore, the rib-shaped portion 15 on the first wall 4 side and the rib-shaped portion 15 on the second wall 5 side are integrated to form a welded plate-shaped portion 9. Consequently, cushioning effect (reinforcement effect) of the hollow body 11 is increased more. Forming the rib-shaped portion 15 to satisfy the above numerical value ranges most increases the cushioning effect of the hollow body 11 on impact received by the impact absorbing member 1. This fact has been confirmed by an experiment.

Providing a number of the above recessed ribs 6 and 7, and rib-shaped portions 15 to the hollow body 11 (increasing rib density) can increase the stiffness of the hollow body 11. Conversely, providing few of them (decreasing rib density) can decrease the stiffness of the hollow body 11. Here, the rib density represents a value obtained by dividing the total surface area of the opening portion opening ends 12 and 14 on the first wall 4 side by the surface area of the first wall 4, and a value obtained by dividing the total surface area of the opening ends 13 and 14 on the second wall 5 side by the surface area of the second wall 5. The recessed ribs 6 and 7, and the rib-shaped portion 15 are hereinafter collectively referred to as rib.

Figure 1B:
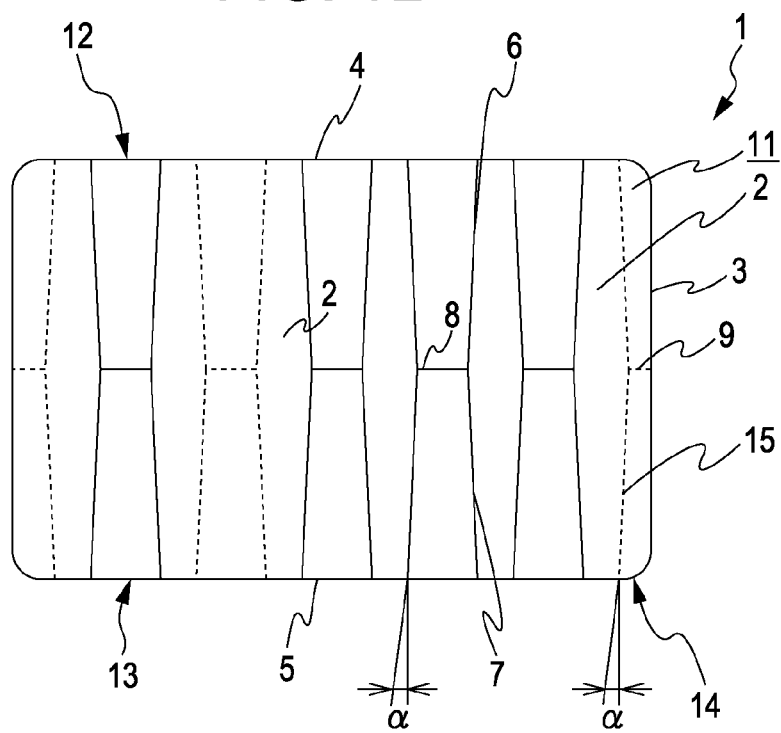
FIG. 1B is a side view of the impact absorbing member.

As illustrated in FIG. 1A, the impact absorbing member 1 includes portions having different rib density. The arrow X side of the dotted line illustrated in FIG. 1A is a low rib density portion 41 having low rib density. On the other hand, the arrow Y side is a high rib density portion 42 having high rib density.

The low rib density portion 41 and the high rib density portion 42 have different impact absorbing performance (stiffness and amount of strain). Therefore, the impact absorbing member 1 (the hollow body 11) includes a plurality of areas (portions) having different impact absorbing performance. A method of changing rib density includes a method of changing an average pitch interval of the ribs. If the rib density is changed by changing the average pitch interval of the ribs, the relationship between an average pitch interval (b) of the ribs of the low rib density portion 41 and an average pitch interval (a) of the ribs of the high rib density portion 42 may satisfy $1.2a \leq b$. In this case, the impact absorbing performance of these two portions can be made apparently different from each other. Moreover, changing the size (diameter in the cross-section) of the rib can also change the rib density.

The above recessed ribs 6 and 7, and rib-shaped portions 15 are welded at substantially a central portion of the hollow body 11. However, they may not be welded at substantially the central portion. The bottom portions of the recessed ribs 6 and 7, and the rib-shaped portions 15 may be welded to a wall surface of the first wall 4 or the second wall 5, for example.

Thermoplastic resin as a material of the hollow body 11 includes known resin. The resin may be resin having high mechanical strength such as stiffness. The resin includes, for example, polyolefin-based resin such as polyethylene and polypropylene, styrene-based resin such as polystyrene and ABS resin, polyester-based resin such as polyethylene terephthalate, polyamide, and a mixture thereof.

Moreover, thermoplastic resin as a material of the hollow body 11 may include one or more kinds of additives insofar as the mechanical strength (impact resistance) is not impaired. The additive includes an additive used in the technical field related to the present disclosure. The additive includes, for example, a filler such as silica, pigment, dye, heat stabilizer, optical stabilizer, plasticizer, antistatic agent, fire retardant, fire extinguishing agent, anti-aging agent, ultraviolet absorber, antioxidizing agent, anti-fogging agent, and lubricant.

<Method of Manufacturing Impact Absorbing Member 1>

Next, an example of a method of manufacturing the impact absorbing member 1 will be described with reference to FIGS. 2 and 3.

Figure 2:
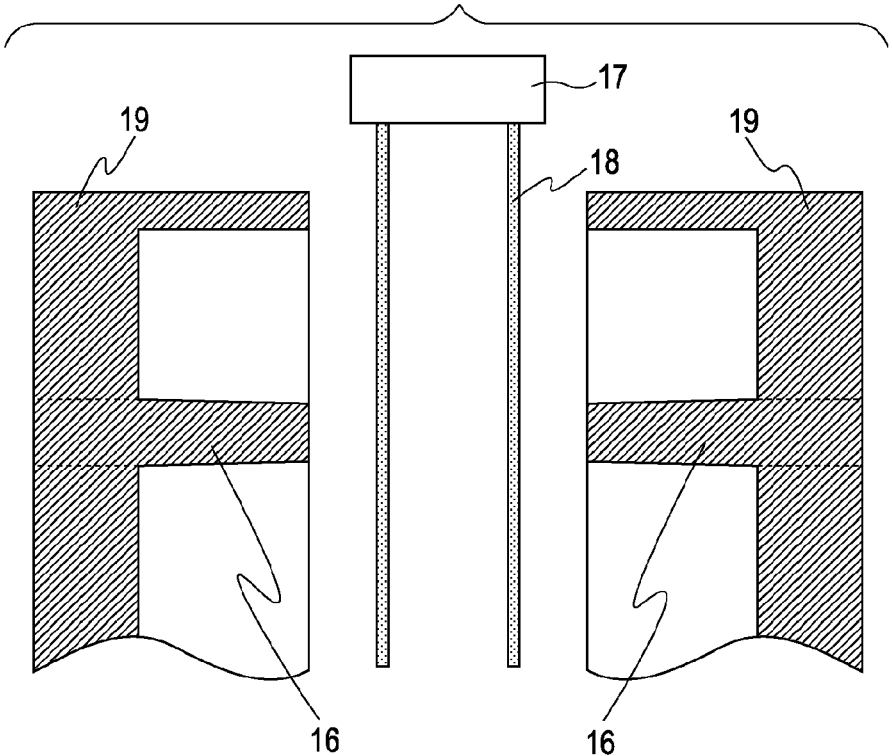
FIG. 2 is a view for explaining a method of manufacturing the impact absorbing member.
Figure 3:
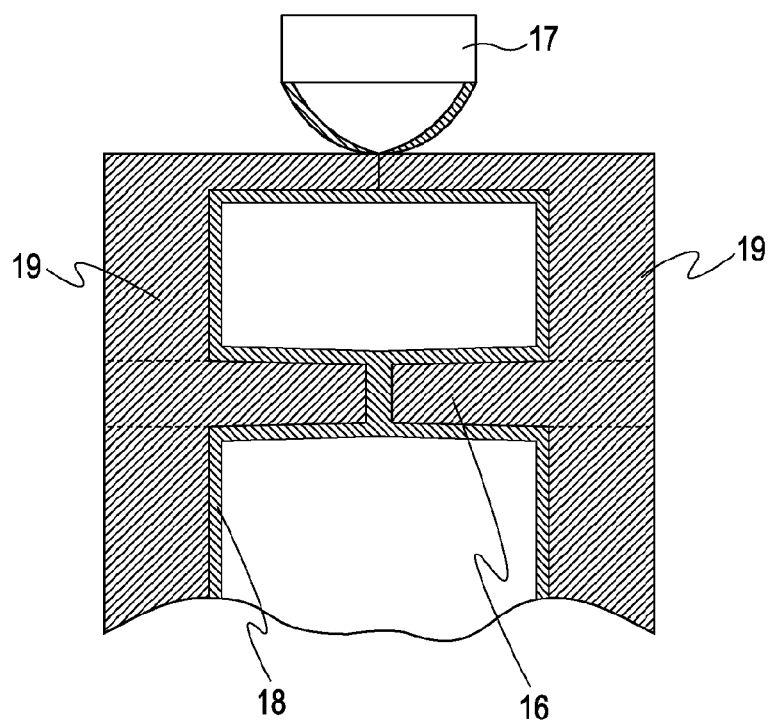
FIG. 3 is a view for explaining the method of manufacturing the impact absorbing member.

The impact absorbing member 1 is manufactured by blow-molding as illustrated in FIGS. 2 and 3. In the blow-molding, a pair of split mold blocks 19 and 19, rib forming cavities 16, and an extrusion die 17 are used.

As illustrated in FIG. 2, the pair of split mold blocks 19 and 19 each includes the rib forming cavity 16 for forming a plurality of ribs. Firstly, parison 18 is disposed between the split mold blocks 19 and 19. Next, clamping is performed as illustrated in FIG. 3. Pressurized air is subsequently introduced from an air blow pin (not shown). As a result, it becomes possible to fit the parison 18 along the rib forming cavities 16.

Subsequently, the parison 18 is cooled. As a result, the hollow body 11 including the plurality of ribs (6, 7, and 15) is formed. Alternatively, the ribs may be formed by sliding the rib forming cavities 16.

<Operation and Effect of Impact Absorbing Member 1>

In this manner, the impact absorbing member 1 includes two different portions (areas), in other words, the low rib density portion (low rib density area) 41 where rib density is low, and the high rib density portion (high rib density area) 42 where rib density is high. In other words, the impact absorbing member 1 includes a plurality of portions (areas) having different impact absorbing performance.

(Second Embodiment)

Next, a second embodiment of the present disclosure will be described with reference to FIGS. 4A and 4B. In the present embodiment, the same reference numerals are assigned to members having similar functions to those of the above-described embodiment, and description thereof will be omitted.

If there is restriction on the size of an impact absorbing member itself, there may also be restriction on rib density. Therefore, it may be difficult to change rib density for different areas.

Hence, an impact absorbing member 1a according to the second embodiment of the present disclosure includes the hollow body 11 having a different configuration from that of the impact absorbing member 1 according to the first embodiment. In other words, as illustrated in FIGS. 4A and 4B, the hollow body 11 of the impact absorbing member 1a includes a plurality of portions having different rib density and thickness. Consequently, a plurality of portions (areas) having apparently different impact absorbing performance is provided to the impact absorbing member 1a.

The hollow body 11 has a thick portion 22 and a thin portion 21. The thick portion 22 has low rib density. On the other hand, the thin portion 21 has high rib density. The relationship between thickness (d) of the thick portion 22 and thickness (c) of the thin portion 21 may satisfy $1.3c \leq d$. In this case, it is possible to make the impact absorbing performance of the thick portion 22 and the thin portion 21 apparently different from each other.

As described above, as an example in the present embodiment, the rib density is set higher in the thick portion 22 than in the thin portion 21. However, the rib density of the thin portion 21 may be set relatively high. The thick portion 22 becomes thin by stretching the parison at the time of blow-molding. Therefore, the stiffness of the thick portion 22 becomes lower than that of the thin portion 21. Therefore, it is possible to dramatically increase the stiffness of the thin portion 21 compared with that of the thick portion 22 by setting the rib density of the thin portion 21 relatively high. As a result, it is possible to make the impact absorbing performance of the thick portion 22 and the thin portion 21 apparently different from each other. Consequently, it is possible to impart desired impact absorbing performance to the impact absorbing member 1a.

In the present embodiment, the thick portion 22 and the thin portion 21 have different rib density from each other. Not limited to this, the rib density may be changed within an area(s) of the thick portion 22 and/or the thin portion 21.

A method of manufacturing the impact absorbing member 1a is different from the above-mentioned method of manufacturing the impact absorbing member 1 according to the first embodiment in that a mold block with a different shape is used. Except for this point, it is possible to manufacture the impact absorbing member 1a similarly to the impact absorbing member 1.

<Operation and Effect of Impact Absorbing Member 1a>

The hollow body 11 of the impact absorbing member 1a includes the plurality of portions (the thick portion 22 and the thin portion 21) having different rib density and thickness. Consequently, it becomes possible to set the stiffness of the thick portion 22 and the thin portion 21 to desired values. Furthermore, the thick portion 22 and the thin portion 21 have rib density different from each other. Consequently, in both portions, the rib's falling manner (crushed manner) is different. Consequently, it is possible to make the impact absorbing performance of the thick portion 22 and the thin portion 21 apparently different from each other.

The impact absorbing members 1 and 1a are preferred embodiments. The scope of the present disclosure is not limited to the impact absorbing members 1 and 1a. The present disclosure can be carried out in modes where various alterations are made unless they depart from the gist thereof.

Figure 5:
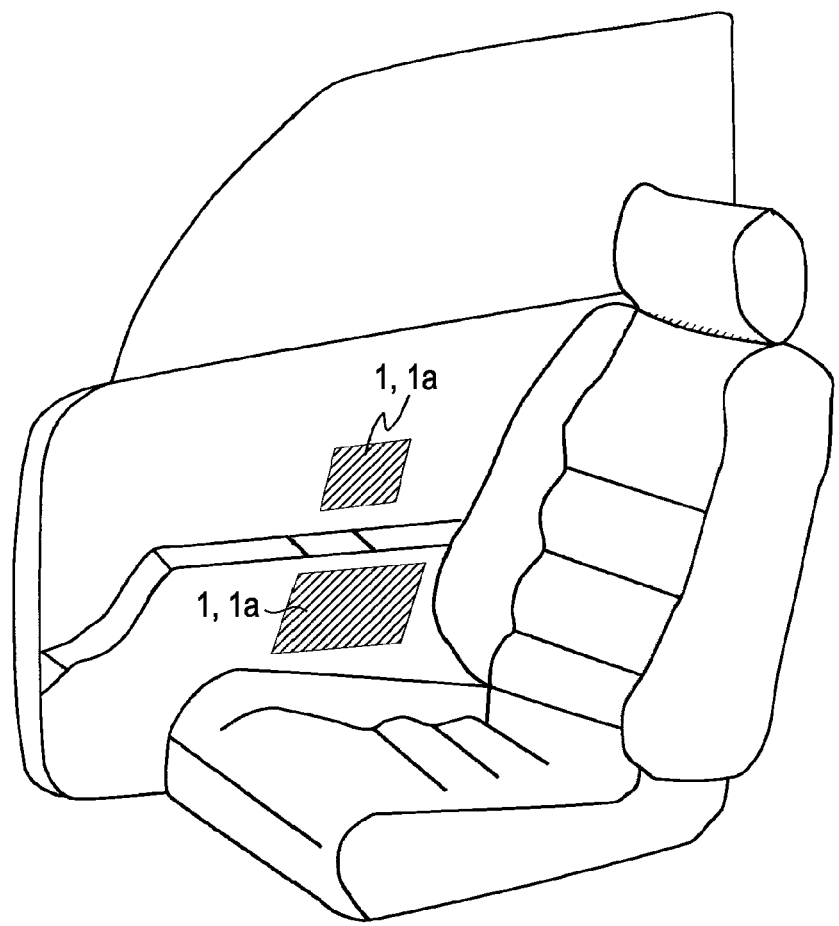
FIG. 5 is an explanatory view illustrating an example of a place to install the impact absorbing member according to the first or second embodiment.
Figure 6:
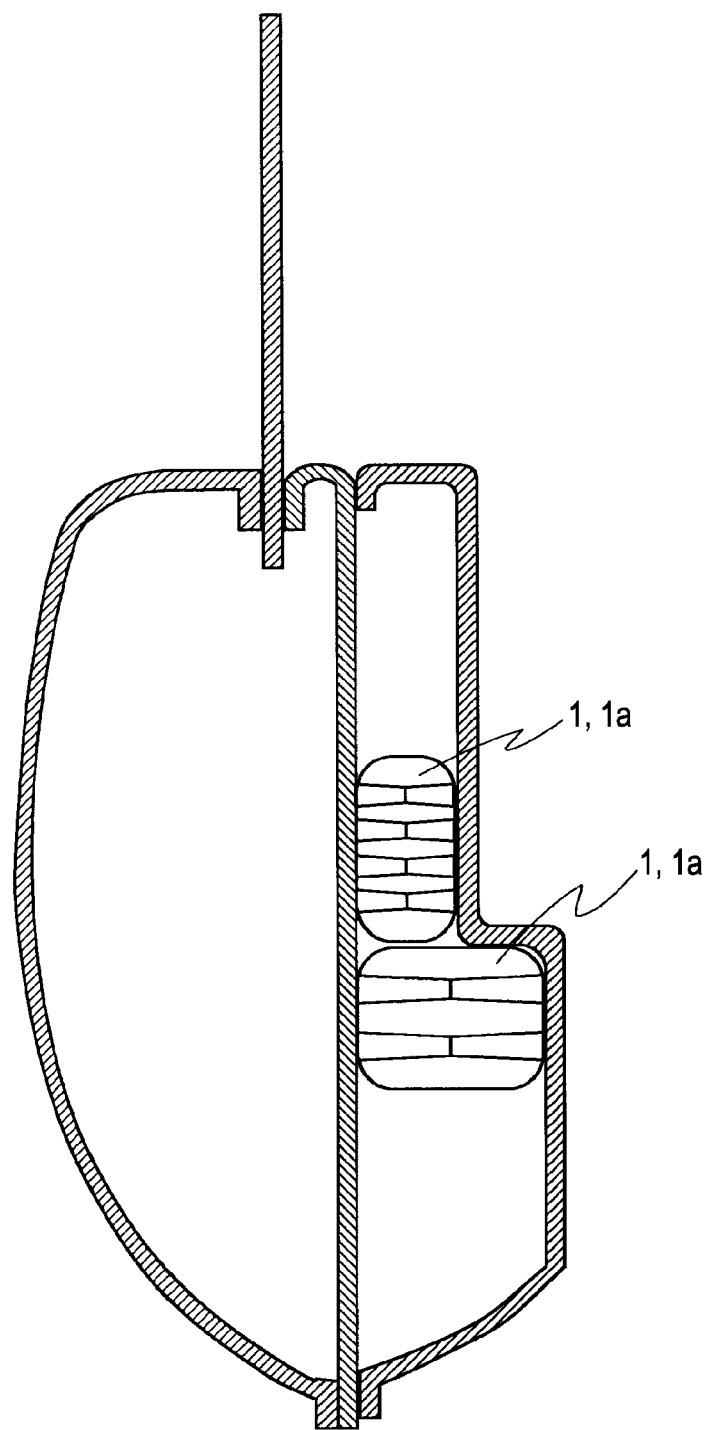
FIG. 6 is a cross-sectional view of a door trim provided therein with the impact absorbing member according to the first or second embodiment.

For example, as illustrated in FIGS. 5 and 6, the impact absorbing members 1 and 1a can be provided between a door panel and a door trim to protect an occupant from impact from the side. In this case, the position to install the impact absorbing members 1 and 1a is determined considering the collision position of the occupant. The collision position is a position where the waist and/or the chest of the occupant hits against the door trim, for example, when impact is imparted to the side of an automobile. Consequently, it is possible to protect the occupant effectively.

Moreover, the impact absorbing members 1 and 1a can be provided inside vehicle components such as a body side panel, a roof panel, a pillar, and a bumper of an automobile and the like. Moreover, it is also possible to use the impact absorbing members 1 and 1a for equipment other than an automobile. It is also possible to use the impact absorbing members 1 and 1a for transport such as a train, a ship, and an airplane.

(Third Embodiment)

The outline of an impact absorbing member 1b according to a third embodiment will be described with reference to FIGS. 7A and 7B. In the present embodiment, the same reference numerals are assigned to members having similar functions to those of the above-described embodiments, and description thereof will be omitted.

The impact absorbing member 1b includes a plate member 10 and the hollow body 11. The hollow body 11 includes the plurality of ribs 6, 7, and 15. The plate member 10 covers at least two or more ribs 6, 7, and 15. The plate member 10 is provided on the impact absorbing surface (e.g., the first wall 4 side) of the hollow body 11.

If impact is imparted to a part of the impact absorbing member 1b (the plate member 10), the impact absorbing member 1b disperses the impact substantially uniformly over substantially the entire surface of the plate member 10. Therefore, concentration of stress only on the ribs 6, 7, and 15 corresponding to the portion that has received the impact is suppressed. Substantially all the ribs 6, 7, and 15, which are covered by the plate member 10, absorb the impact. The impact absorbing member 1b will be described in detail with reference to the accompanying drawings.

Figure 7A:
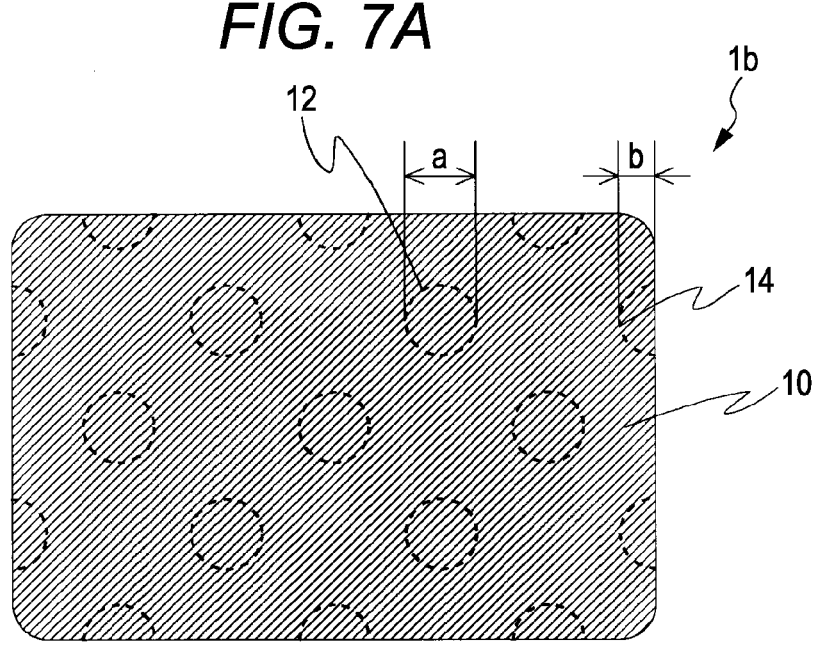
FIG. 7A is a plan view of an impact absorbing member according to a third embodiment.
Figure 7B:
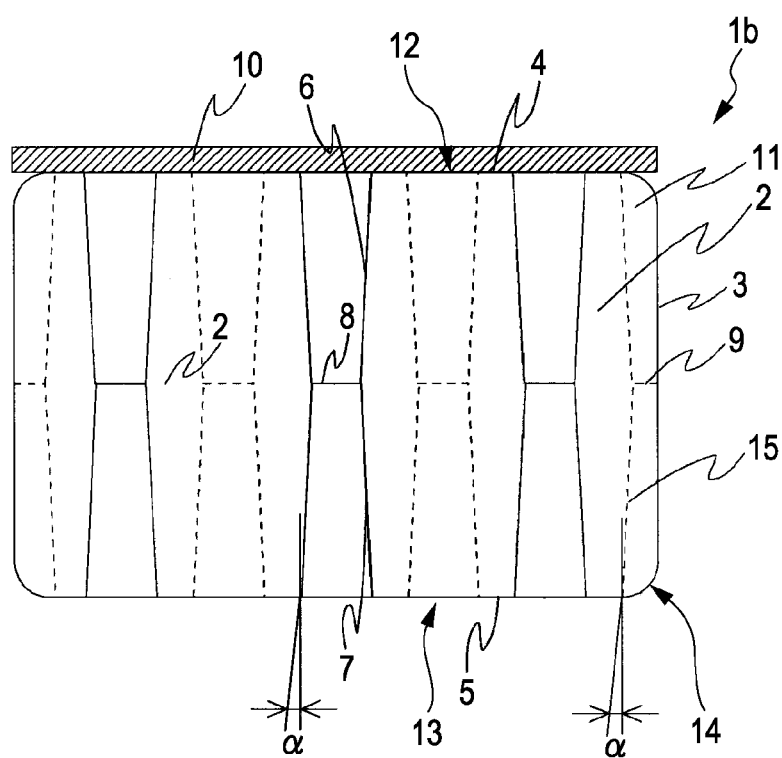
FIG. 7B is a side view of the impact absorbing member.

As illustrated in FIGS. 7A and 7B, the impact absorbing member 1b is provided with the plate member 10 on a surface that receives impact on the hollow body 11 (a surface on the first wall 4 side; hereinafter referred to as impact absorbing surface). The hollow body 11 is molded into a hollow shape by blow-molding thermoplastic resin.

The plate member 10 receives impact as a plane. Consequently, the impact is substantially uniformly dispersed over the plurality of ribs 6, 7, and 15 covered by the plate member 10. Therefore, the plate member 10 is provided so as to cover at least two or more ribs 6, 7, and 15. Consequently, if impact is imparted to a part of the impact absorbing member 1b (the plate member 10), the impact is substantially uniformly dispersed over substantially the entire surface of the plate member 10. Therefore, concentration of stress only on the ribs 6, 7, and 15 corresponding to a portion that has received the impact is suppressed. Substantially all the ribs 6, 7, and 15, which are covered by the plate member 10, absorb the impact. Therefore, the impact absorbing member 1b (the hollow body 11) can absorb impact effectively. It is preferable that the plate member 10 be provided so as to cover substantially the entire surface of the impact absorbing surface of the hollow body 11. Moreover, it is preferable that the plate member 10 be a single plate. Consequently, substantially all the ribs 6, 7, and 15 formed on the impact absorbing surface of the hollow body 11 can absorb impact.

Moreover, a plurality of small plate members 10 may be provided on the impact absorbing surface of the hollow body 11. In this case, it is preferable that each plate member 10 cover at least two or more ribs 6, 7, and 15. Consequently, substantially all the ribs 6, 7, and 15 covered by the plate member 10 absorb impact. Consequently, impact is absorbed effectively.

Moreover, the plate member 10 may be provided not only on the impact absorbing surface (the surface on the first wall 4 side in FIGS. 7A and 7B) of the hollow body 11 but also on a surface facing the impact absorbing surface (the surface on the second wall 5 side in FIGS. 7A and 7B). Moreover, the plate member 10 may be provided on a side surface (the surface on the peripheral wall surface 3 side). Consequently, it is possible to increase the impact resistance of the impact absorbing member 1b (the hollow body 11) to impact from the side. Consequently, it is possible to further increase the stiffness of the impact absorbing member 1b.

The plate member 10 has a function of dispersing impact that concentrates on a part. Therefore, it is preferable that the stiffness of a material of the plate member 10 be higher than at least that of a material forming the hollow body 11. Moreover, it is preferable that the material of the plate member 10 have high elasticity (high stability). Therefore, it is possible to use known thermoplastic resin or metal having, for example, the above stiffness and elasticity as the material of the plate member 10.

The impact absorbing member 1b according to the present embodiment includes the hollow body 11. Substantially the entire surface of the hollow body 11 is substantially uniform in thickness. The hollow body 11 includes the hollow portion 2, the peripheral wall surface (or side wall) 3, the first wall 4, and the second wall 5. The first wall 4 of the hollow body 11 includes the plurality of recessed ribs 6. The recessed rib 6 is the portion recessed into the second wall 5. The second wall 5 includes the plurality of recessed ribs 7. The recessed rib 7 is the portion recessed into the first wall 4. The recessed rib 6 and the recessed rib 7 are provided so as to face each other. The bottom portion of the recessed rib 6 and the bottom portion of the recessed rib 7 are welded to each other at substantially the middle position between the first wall 4 and the second wall 5. Therefore, the bottom portions of the recessed ribs 6 and 7 are integrated to form the welded plate-shaped portion 8.

Moreover, the recessed ribs 6 and 7 have substantially circular cross-sections. The recessed rib 6 includes the opening end 12 at the first wall 4. The recessed rib 7 includes the opening end 13 at the second wall 5. The recessed ribs 6 and 7 have the inner diameters that decrease from the opening ends 12 and 13 toward the welded plate-shaped portion 8. The angle α of the decreasing diameter is within a range of 5 to 30°. The diameter A of the opening ends 12 and 13 is within a range of 10 to 40 mm. If the recessed ribs 6 and 7 are formed to satisfy the numerical value ranges, the central positions of the recessed ribs 6 and 7 are bent into a "<" shape when the impact absorbing member 1 receives impact. Such a configuration leads to the highest cushioning effect of the hollow body 11 on the impact received by the impact absorbing member 1. This fact has been confirmed by the experiment. The recessed ribs 6 and 7 may have oblong cross-sections.

The plurality of rib-shaped portions 15 is formed at appropriate intervals on the peripheral wall surface 3 (side wall) of the hollow body 11. The rib-shaped portion 15 is formed by recessing a part of the peripheral wall surface 3 toward the hollow portion 2. The rib-shaped portion 15 has the opening end 14 at the first wall 4 or the second wall 5. The rib-shaped portion 15 has substantially semicircular cross-section. The rib-shaped portion 15 has the inner diameter that decreases from the opening end 14 toward the hollow portion 2 of the hollow body 11. The angle α of the decreasing diameter is within a range of 5 to 30°. The radius B of the opening end 14 is within a range of 5 to 20 mm.

As illustrated in FIGS. 7A and 7B, the rib-shaped portion 15 on the first wall 4 side and the rib-shaped portion 15 on the second wall 5 side are welded to each other at substantially the middle position between the first wall 4 and the second wall 5. Therefore, the rib-shaped portion 15 on the first wall 4 side and the rib-shaped portion 15 on the second wall 5 side are integrated to form the welded plate-shaped portion 9. Consequently, cushioning effect (reinforcement effect) of the hollow body 11 is increased more. Forming the rib-shaped portion 15 to satisfy the above numerical value ranges most increases the cushioning effect of the hollow body 11 on impact received by the impact absorbing member 1. This fact has been confirmed by the experiment.

Providing a number of the above recessed ribs 6 and 7, and rib-shaped portions 15 to the hollow body 11 (increasing rib density) can increase the stiffness of the hollow body 11. Conversely, providing few of them (decreasing rib density) can decrease the stiffness of the hollow body 11. Here, the rib density represents a value obtained by dividing the total surface area of the opening portion opening ends 12 and 14 on the first wall 4 side by the surface area of the first wall 4, and a value obtained by dividing the total surface area of the opening ends 13 and 14 on the second wall 5 side by the surface area of the second wall 5. The recessed ribs 6 and 7, and the rib-shaped portion 15 are hereinafter collectively referred to as rib.

In the configuration illustrated in FIGS. 7A and 7B, the above recessed ribs 6 and 7, and rib-shaped portions 15 are welded at substantially the central portion of the hollow body 11. However, they may not be welded at substantially the central portion. The bottom portions of the recessed ribs 6 and 7, and the rib-shaped portions 15 may be welded to the wall surface of the first wall 4 or the second wall 5, for example.

The plate member 10 can be also welded to the hollow body 11 using a known adhesive or the like after the hollow body 11 is formed by blow-molding. Moreover, for example, if the bottom portions of the recessed ribs 6 and 7 are welded to the wall surface, it is also possible to weld the plate member 10 to the hollow body 11 by insert molding at the time of molding the hollow body 11.

Thermoplastic resin as a material of the hollow body 11 includes known resin. The resin may be resin having high mechanical strength such as stiffness. The resin includes, for example, polyolefin-based resin such as polyethylene and polypropylene, styrene-based resin such as polystyrene and ABS resin, polyester-based resin such as polyethylene terephthalate, polyamide, and a mixture thereof.

Moreover, thermoplastic resin as a material of the hollow body 11 may include one or more kinds of additives insofar as the mechanical strength (impact resistance) is not impaired. The additive includes an additive used in the technical field related to the present disclosure. The additive includes, for example, a filler such as silica, pigment, dye, heat stabilizer, optical stabilizer, plasticizer, antistatic agent, fire retardant, fire extinguishing agent, anti-aging agent, ultraviolet absorber, antioxidizing agent, anti-fogging agent, and lubricant.

<Method of Manufacturing Impact Absorbing Member 1b>

Next, an example of a method of manufacturing the impact absorbing member 1b will be described with reference to FIGS. 8 and 9. In a manufacturing method shown below, the impact absorbing member 1b is manufactured by integrated molding by blow-molding. In this case, the recessed ribs 7 are formed from the second wall 5 side. Therefore, the welded plate-shaped portion 8 is formed, integrated with the first wall 4. In other words, the bottom portion of the recessed rib 7 is welded to the wall surface of the first wall 4.

Figure 8:
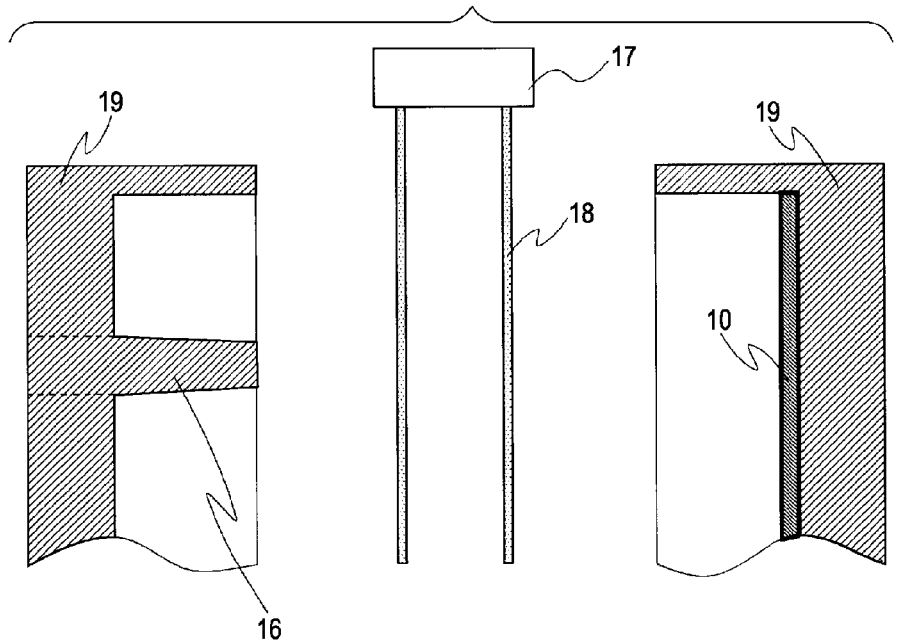
FIG. 8 is a view for explaining a method of manufacturing the impact absorbing member.
Figure 9:
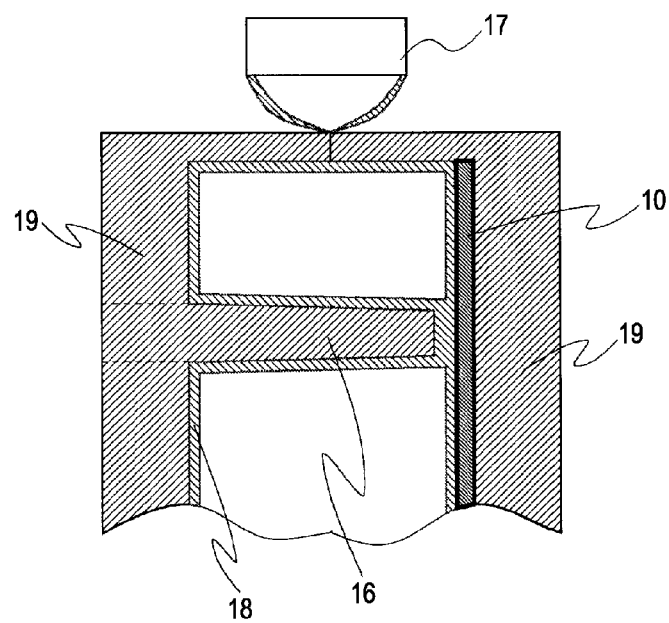
FIG. 9 is a view for explaining the method of manufacturing the impact absorbing member.

The impact absorbing member 1b is manufactured by blow-molding as illustrated in FIGS. 8 and 9. In other words, in the blow-molding, the pair of split mold blocks 19 and 19, the rib forming cavity 16, and the extrusion die 17 are used.

As illustrated in FIG. 8, one of the split mold blocks 19 includes the rib forming cavity 16 that forms a plurality of ribs. The other split mold block 19 does not include the rib forming cavity 16. Firstly, the molded plate member 10 is placed in the other split mold block 19 in advance. Next, the parison 18 is disposed between the pair of split mold blocks 19 and 19. Next, clamping is performed as illustrated in FIG. 9. Pressurized air is subsequently introduced from an air blow pin (not shown). As a result, it becomes possible to fit the parison 18 along the rib forming cavity 16. Consequently, the hollow body 11 including the plurality of ribs (6, 7, and 15) is formed. Furthermore, the plate member 10 is welded so as to cover at least two or more ribs (6, 7, and 15) upon blow-molding.

Consequently, the plate member 10 is heat-welded to the parison 18. At this point, if the plate member 10 is smaller than the first wall 4, the parison 18 surrounds the plate member 10 by blow-molding. The plate member 10 is heat-welded so that the plate member 10 sinks into the parison 18. Moreover, the hollow body 11 is molded using the mold block 19 where the plate member 10 is placed in advance. Therefore, for example, even if the thickness of the plate member 10 is partially different, it is possible to easily make an exposed surface (a surface on the outer side, in other words, the impact absorbing surface) of the plate member 10 horizontal compared with a case where the plate member 10 is adhered by an adhesive or the like to the molded hollow body 11.

It is possible to use a known blow-molding method except that the plate member 10 is placed in a mold block without the rib forming cavity 16 so as to cover at least two or more ribs. The rib forming cavity 16 may be provided slidably to the mold block 19.

<Operation and Effect of Impact Absorbing Member 1b>

In this manner, the impact absorbing member 1b is provided with the plate member 10 on the impact absorbing surface of the hollow body 11 so as to cover at least two or more ribs 6, 7, and 15. Consequently, if impact is imparted to a part of the impact absorbing member 1b (the plate member 10), the impact is substantially uniformly dispersed over substantially the entire surface of the plate member 10. Therefore, concentration of stress only on the ribs 6, 7, and 15 corresponding to the portion that has received the impact is suppressed. Substantially all (at least two or more) the ribs 6, 7, and 15 covered by the plate member 10 absorb impact. Therefore, the impact absorbing member 1b can absorb impact effectively.

(Fourth Embodiment)

Next, an impact absorbing member 1c according to a fourth embodiment will be described. In the present embodiment, the same reference numerals are assigned to members having similar functions to those of the above-described embodiments, and description thereof will be omitted. As illustrated in FIGS. 10A, 10B, 11A, and 11B, the impact absorbing member 1c includes the plate member 10 and the hollow body 11, similarly to the impact absorbing member 1b. The plate member 10 is provided on the impact absorbing surface (e.g., the first wall 4 side) of the hollow body 11. The hollow body 11 is molded into a hollow shape by blow-molding thermoplastic resin.

The shape and/or the thickness of the impact absorbing member 1c may be restricted by the shape and/or the thickness of space where the impact absorbing member 1c is disposed. To handle such a case, the hollow body 11 of the impact absorbing member 1c includes the thin portion 21 and the thick portion 22.

Even if the thin portion 21 and the thick portion 22 receive similar impact, their amounts of strain are not similar. If the relationship between the thickness (d) of the thick portion 22 and the thickness (c) of the thin portion 21 satisfies 1.3c≤d, difference in impact absorbing property between the thick portion 22 and the thin portion 21 becomes apparent.

Figure 10A:
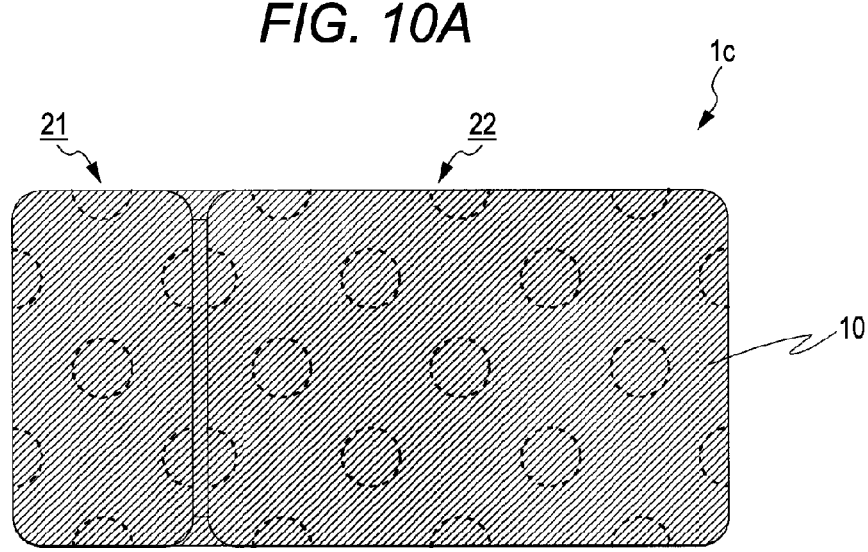
FIG. 10A is a plan view of an impact absorbing member according to a fourth embodiment.
Figure 10B:
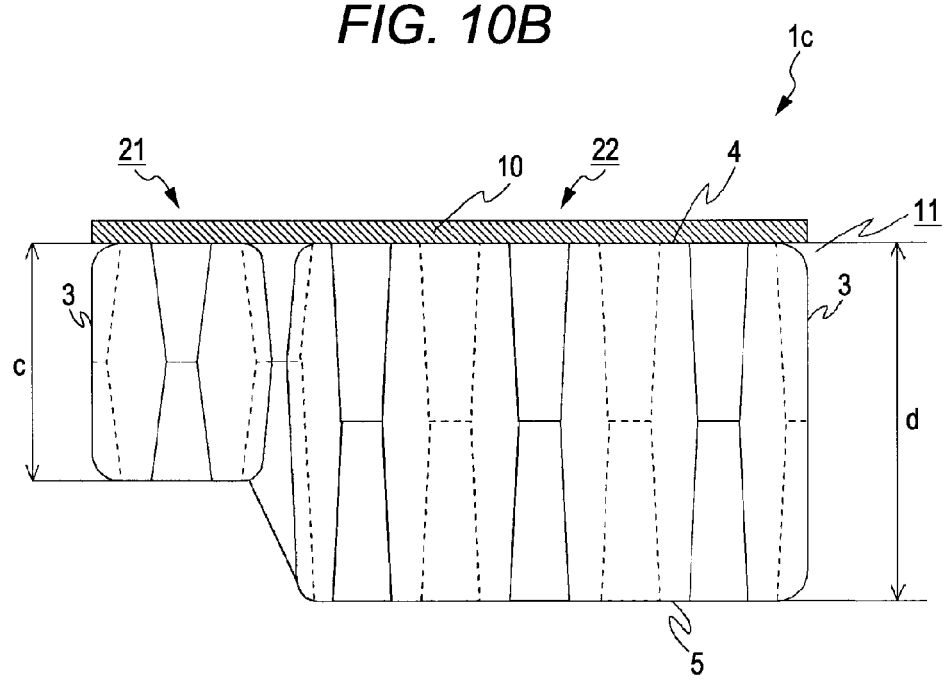
FIG. 10B is a side view of the impact absorbing member.

Therefore, the impact absorbing member 1c is provided with the plate member 10 on the impact absorbing surface of the hollow body 11 so as to cover both the thin portion 21 and the thick portion 22, as illustrated in FIGS. 10A and 10B. Consequently, if impact is imparted to a part of the plate member 10, the impact is substantially uniformly dispersed over substantially the entire surface of the plate member 10. Therefore, it is possible to suppress strain of only a portion that has received the impact (e.g., the thick portion 22). In other words, it becomes possible to make the amounts of strain of both the thick portion 22 and the thin portion 21 almost equal. As a result, the thin portion 21 and the thick portion 22 can be substantially uniformly strained. Therefore, the impact absorbing member 1c can absorb impact effectively.

In the configuration illustrated in FIGS. 10A and 10B, the plate member 10 is provided so as to cover substantially all the thin portion 21 and the thick portion 22. However, the plate member 10 may cover at least a part of the thin portion 21 and at least a part of the thick portion 22. Also with this configuration, effect similar to that of the configuration illustrated in FIGS. 10A and 10B can be obtained.

Moreover, as illustrated in FIGS. 10A and 10B, the plurality of ribs (6, 7, and 15) may be provided to both the thin portion 21 and the thick portion 22. In this case, the plate member 10 is provided so as to cover at least one rib in the thin portion 21 and at least one rib in the thick portion 22. Moreover, the ribs may not be provided to the thin portion 21 and the thick portion 22. In this case, the plate member 10 is provided so as to cover at least a part of the thin portion 21 and at least a part of the thick portion 22. In this manner, the impact absorbing member 1c is provided with the plate member 10 on the impact absorbing surface (the surface on the first wall 4 side) so as to cover at least a part of the thin portion 21 and at least a part of the thick portion 22, as illustrated in FIGS. 10A and 10B. Consequently, even if the shape and/or the thickness of the impact absorbing member 1c is restricted by the shape and/or the thickness of space to install the impact absorbing member 1c, the impact absorbing member 1c can absorb impact effectively.

Moreover, the hollow body 11 of the impact absorbing member 1c includes the thin portion 21 and the thick portion 22. If the impact absorbing member 1c is manufactured by blow-molding parison having almost the same thickness, the thick portion 22 is stretched more largely. Therefore, the thickness of the thick portion 22 becomes relatively thin. Therefore, the stiffness of the thick portion 22 is lower than that of the thin portion 21.

Figure 11A:
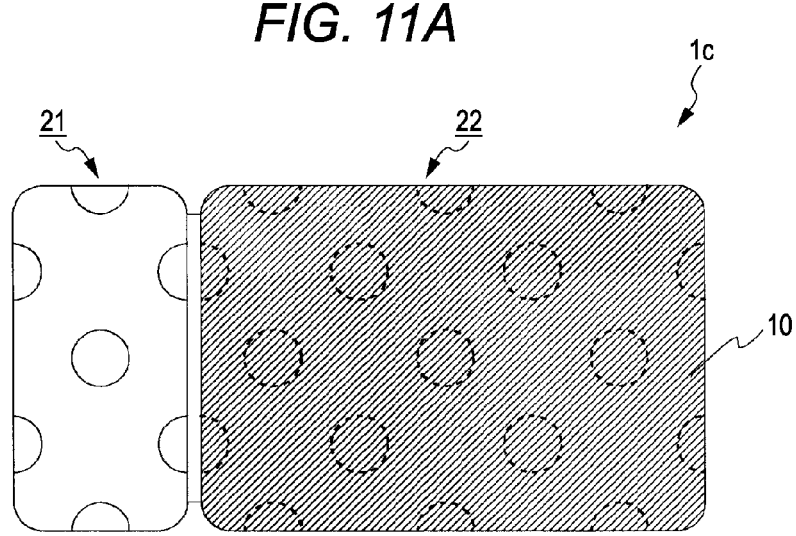
FIG. 11A is a plan view of the impact absorbing member.
Figure 11B:
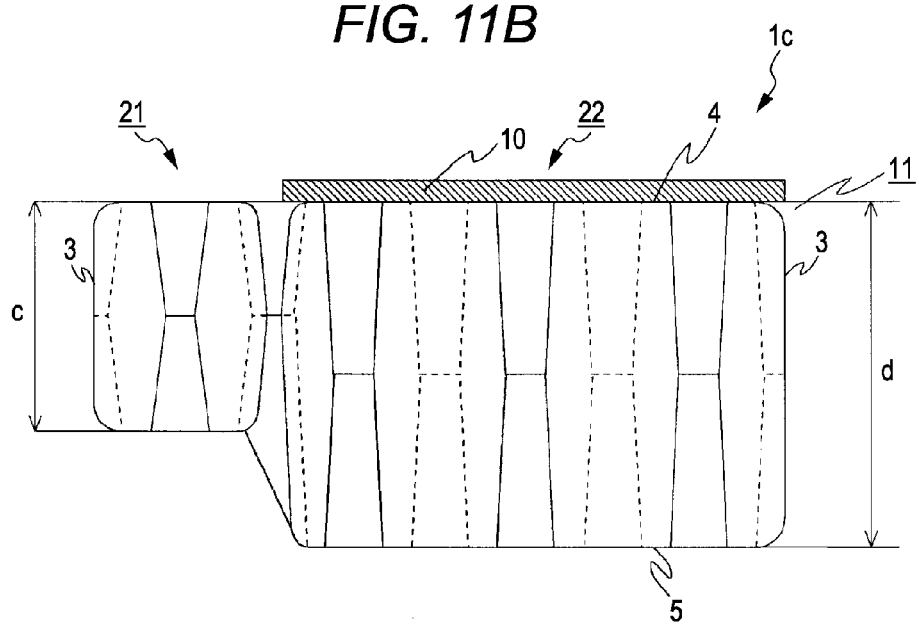
FIG. 11B is its side view.

Therefore, the impact absorbing member 1c may be provided with the plate member 10 on the impact absorbing surface so as to cover the thick portion 22, as illustrated in FIGS. 11A and 11B. Consequently, the stiffness of the thick portion 22 is increased by the plate member 10. As a result, the stiffness of the thick portion 22 approaches the stiffness of the thin portion 21. As a result, it is possible to promote the balance of the stiffness between the thin portion 21 and the thick portion 22.

As illustrated in FIGS. 11A and 11B, the plurality of ribs (6, 7, and 15) may be provided to the thick portion 22. In this case, the plate member 10 is provided so as to cover at least two or more ribs. Consequently, substantially all the ribs covered by the plate member 10 absorb impact. Therefore, the impact absorbing member 1c can absorb impact effectively.

Moreover, a plurality of small plate members 10 may be provided on the impact absorbing surface of the hollow body 11. In this case, it is preferable that each plate member 10 cover at least two or more ribs 6, 7, and 15. Consequently, substantially all the ribs covered by the plate member 10 absorb impact. Consequently, impact is absorbed effectively.

The plate member 10 may be provided not only on the impact absorbing surface of the hollow body 11 but also on the surface facing the impact absorbing surface. Moreover, the plate member 10 may be provided to the side surface (the surface on the peripheral wall surface 3 side). Consequently, it is possible to increase the impact resistance of the impact absorbing member 1c (the hollow body 11) to impact from the side. Consequently, it is possible to further increase the stiffness of the impact absorbing member 1c.

In the configuration illustrated in FIGS. 11A and 11B, the plate member 10 of a single plate is provided on the impact absorbing surface of the hollow body 11 so as to cover the thick portion 22. In this configuration, the stiffness of the thick portion 22 is increased by the plate member 10 of a single plate. However, as illustrated in FIGS. 10A and 10B, the plate member 10 of a single plate may be provided so as to cover both the thick portion 22 and the thin portion 21. While the portion of the plate member 10, which covers the thick portion 22, may be made thick, the portion covering the thin portion 21 may be made thin. In this case, while the stiffness of the thick portion 22 is increased, the stiffness of the thin portion 21 is not increased so much. In this manner, in the impact absorbing member 1c, the thickness (or the material) of the plate member 10 may be partially changed. Consequently, it becomes possible to partially adjust the stiffness of the impact absorbing member 1c (the hollow body 11).

A method of manufacturing the impact absorbing member 1c is different from the above-mentioned method of manufacturing the impact absorbing member 1b according to the third embodiment in that a mold block with a different shape is used. Except for this point, it is possible to manufacture the impact absorbing member 1c similarly to the impact absorbing member 1b.

<Operation and Effect of Impact Absorbing Member 1c>

In this manner, in the impact absorbing member 1c, the hollow body 11 includes the thin portion 21 and the thick portion 22. As illustrated in FIGS. 10A and 10B, the impact absorbing member 1c is provided with the plate member 10 on the impact absorbing surface of the hollow body 11 so as to cover at least a part of the thin portion 21 and at least a part of the thick portion 22. Consequently, if impact is imparted to a part of the plate member 10, the impact is substantially uniformly dispersed over substantially the entire surface of the plate member 10. Therefore, it is possible to suppress strain of only a portion that has received the impact (e.g., a portion of the thick portion 22). In other words, both the thick portion 22 and the thin portion 21, which are covered by the plate member 10, are strained with almost the same amount of strain. Accordingly, even if the hollow body 11 of the impact absorbing member 1c includes the thin portion 21 and the thick portion 22 due to restriction on the shape and the like of the position to install the impact absorbing member 1c, the impact absorbing member 1c can absorb impact effectively.

Moreover, the impact absorbing member 1c including the thin portion 21 and the thick portion 22 may be provided with the plate member 10 on the impact absorbing surface so as to cover the thick portion 22, as illustrated in FIGS. 11A and 11B. Consequently, the stiffness of the thick portion 22 can be increased by the plate member 10. As a result, it is possible to promote the balance of the stiffness between the thin portion 21 and the thick portion 22. Even in this configuration, substantially all the ribs covered by the plate member 10 absorb impact. Therefore, the impact absorbing member 1c can absorb impact effectively.

(Fifth Embodiment)

Next, an impact absorbing member 1d according to a fifth embodiment will be described. In the present embodiment, the same reference numerals are assigned to members having similar functions to those of the above-described embodiments, and description thereof will be omitted. As illustrated in FIGS. 12A, 12B, 13A, and 13B, the impact absorbing member 1d includes the plate member 10 and the hollow body 11, similarly to the impact absorbing members 1a to 1c. The plate member 10 is provided on the impact absorbing surface (e.g., the first wall 4 side) of the hollow body 11. The hollow body 11 is molded into a hollow shape by blow-molding thermoplastic resin.

Figure 12A:
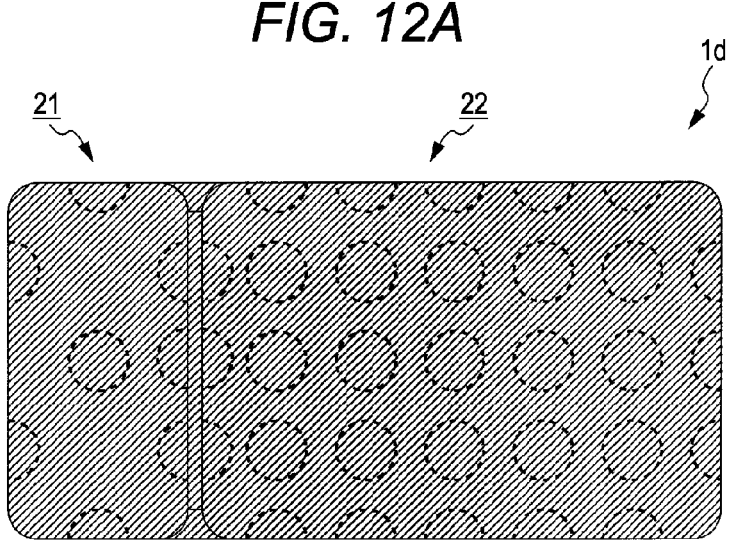
FIG. 12A is a plan view of an impact absorbing member according to a fifth embodiment.
Figure 12B:
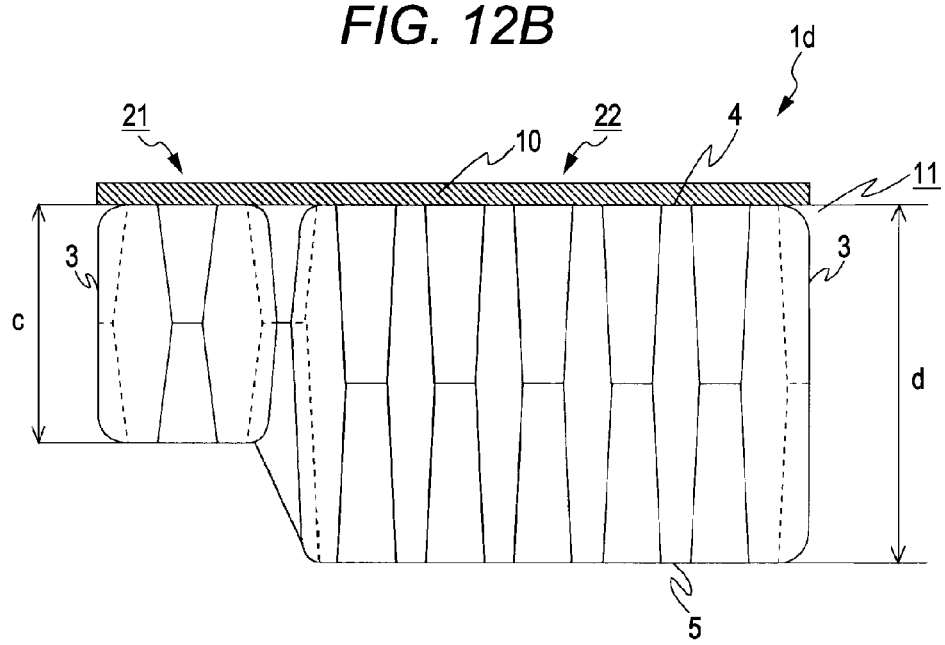
FIG. 12B is a side view of the impact absorbing member.

As illustrated in FIGS. 12A and 12B, in the impact absorbing member 1d, the rib density of the hollow body 11 is higher than that of the impact absorbing member 1c according to the fourth embodiment. Consequently, the stiffness of the thick portion 22 is increased. Consequently, the stiffness of the thick portion 22 approaches the stiffness of the thin portion 21. Consequently, the balance of the stiffness between the thin portion 21 and the thick portion 22 is promoted.

In this manner, in the hollow body 11 of the impact absorbing member 1d, the thin portion 21 and the thick portion 22 have almost the equal stiffness. Furthermore, the impact absorbing member 1d is provided with the plate member 10 on the impact absorbing surface of the hollow body 11 so as to cover the thin portion 21 and the thick portion 22 of the hollow body 11. In this manner, in the hollow body 11 of the impact absorbing member 1d, the plate member 10 covers the thin portion 21 and the thick portion 22 having almost the equal stiffness. Therefore, when the impact absorbing member 1d receives impact, both the thin portion 21 and the thick portion 22 receive the same stress and are strained similarly. As a result, in the impact absorbing member 1d, it is possible to promote the balance of the stiffness between the thin portion 21 and the thick portion 22, and strain the thin portion 21 and the thick portion 22 almost uniformly. Therefore, the impact absorbing member 1d can absorb impact effectively.

The impact absorbing member 1c according to the fourth embodiment illustrated in FIGS. 11A and 11B is provided with the plate member 10 on the impact absorbing surface so as to cover the thick portion 22. Consequently, the stiffness of the thick portion 22 is increased by the plate member 10. However, it is also possible to increase the stiffness of the thick portion 22 by increasing the rib density of the thick portion 22. However, there is an upper limit to rib density.

Figure 13A:
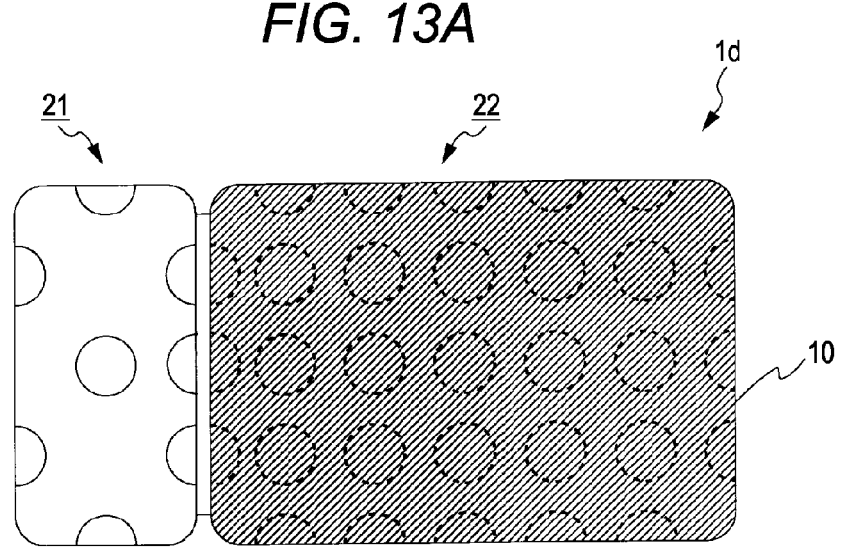
FIG. 13A is a plan view of the impact absorbing member.
Figure 13B:
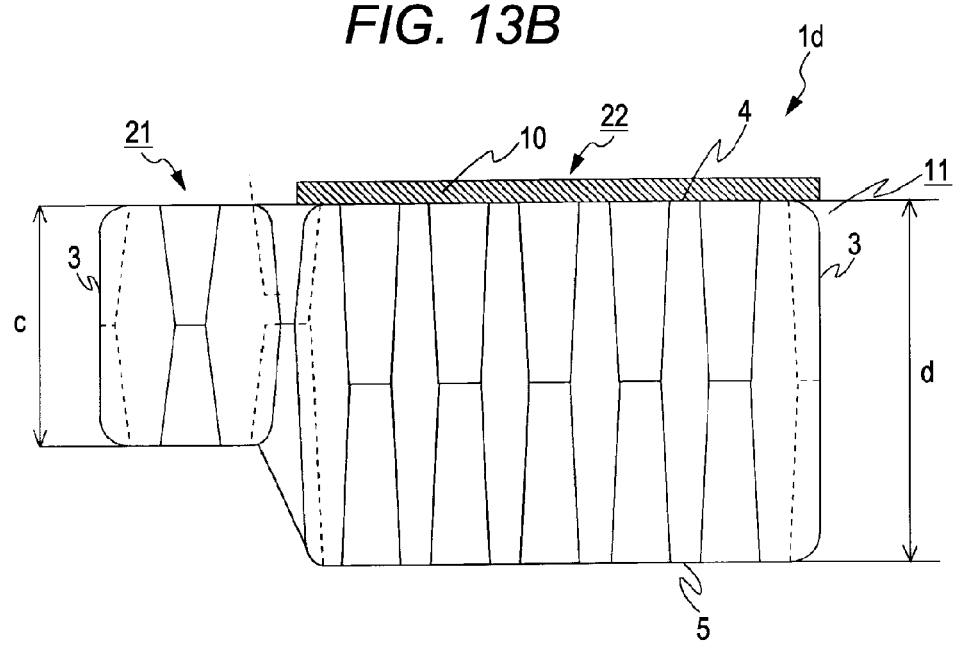
FIG. 13B is a side view of the impact absorbing member.

Therefore, the impact absorbing member 1d may have the configuration illustrated in FIGS. 13A and 13B. In this configuration, the stiffness of the thick portion 22 is increased by increasing the rib density of the thick portion 22. Furthermore, in this configuration, the plate member 10 is provided on the impact absorbing surface so as to cover the thick portion 22. In other words, the stiffness of the thick portion 22 is increased also by the plate member 10.

In this manner, in the impact absorbing member 1d illustrated in FIGS. 13A and 13B, not only the rib density of the thick portion 22 is increased, but also the plate member 10 is provided on the impact absorbing surface so as to cover the thick portion 22. Consequently, the stiffness of the thick portion 22 approaches the stiffness of the thin portion 21. As a result, the balance of the stiffness is promoted between the stiffness of the thick portion 22 and the thin portion 21.

Moreover, it is possible to increase the number of the ribs covered by the plate member 10 by increasing the rib density of the thick portion 22. As a result, many ribs covered by the plate member 10 absorb impact. Consequently, the impact absorbing member 1d can absorb impact effectively.

Moreover, in the configuration illustrated in FIGS. 13A and 13B, the plate member 10 of a single plate is provided on the impact absorbing surface of the hollow body 11 so as to cover the thick portion 22. In this configuration, the stiffness of the thick portion 22 is increased by the plate member 10 of a single plate. However, as illustrated in FIGS. 12A and 12B, the plate member 10 of a single plate may be provided so as to cover both the thick portion 22 and the thin portion 21. While the portion of the plate member 10, which covers the thick portion 22, may be made thick, the portion covering the thin portion 21 may be made thin. In this case, while the stiffness of the thick portion 22 is increased, the stiffness of the thin portion 21 is not increased so much. In this manner, in the impact absorbing member 1d, the thickness (or the material) of the plate member 10 may be partially changed. Consequently, it becomes possible to partially adjust the stiffness of the impact absorbing member 1d (the hollow body 11).

A method of manufacturing the impact absorbing member 1d is different from the above-mentioned method of manufacturing the impact absorbing member 1b according to the third embodiment in that a mold block with a different shape is used. Except for this point, it is possible to manufacture the impact absorbing member 1d similarly to the impact absorbing member 1b.

<Operation and Effect of Impact Absorbing Member 1d>

In this manner, in the impact absorbing member 1d, the hollow body 11 includes the thin portion 21 and the thick portion 22. As illustrated in FIGS. 12A and 12B, in the impact absorbing member 1d, the rib density of the thick portion 22 is increased to make the stiffness of the thin portion 21 and the thick portion 22 almost equal. Furthermore, the plate member 10 covering at least a part of the thin portion 21 and at least a part of the thick portion 22 is provided on the impact absorbing surface of the hollow body 11. Consequently, when the impact absorbing member 1d receives impact, the thin portion 21 and the thick portion 22, which have almost the equal stiffness, are strained almost uniformly. Therefore, the impact absorbing member 1d can absorb impact effectively.

Moreover, in the impact absorbing member 1d including the thin portion 21 and the thick portion 22, the plate member 10 is provided on the impact absorbing surface so as to cover the thick portion 22 while the rib density of the thick portion 22 is increased, as illustrated in FIGS. 13A and 13B. Consequently, the stiffness of the thick portion 22 is increased by the high rib density and the plate member 10. As a result, it is possible to promote the balance of the stiffness between the thin portion 21 and the thick portion 22. Even with this configuration, substantially all the ribs covered by the plate member 10 absorb impact. Therefore, the impact absorbing member 1d can absorb impact effectively.

(Sixth Embodiment)

Next, an impact absorbing member 1e according to a sixth embodiment will be described. In the present embodiment, the same reference numerals are assigned to members having similar functions to those of the above-described embodiments, and description thereof will be omitted. As illustrated in FIGS. 14A, 14B, 15A, 15B, 16A, and 16B, the impact absorbing member 1e includes the plate member 10 and the hollow body 11, similarly to the impact absorbing members 1a to 1d. The plate member 10 is provided on the impact absorbing surface (e.g., the first wall 4 side) of the hollow body 11. The hollow body 11 is molded into a hollow shape by blow-molding thermoplastic resin.

The impact absorbing member 1e is different from the configuration of the impact absorbing member 1b according to the third embodiment in that the rib density in the hollow body 11 is different. The arrow X side of the dotted line illustrated in FIG. 14A is the low rib density portion 41 having low rib density, and the arrow Y side is the high rib density portion 42 having high rib density.

Even if the low rib density portion 41 and the high rib density portion 42 receive similar impact, their amounts of strain are not similar. A method of changing rib density includes, for example, a method of changing an average pitch interval of the ribs. If the rib density is changed by changing the average pitch interval of the ribs, difference in impact absorbing property between the low rib density portion 41 and the high rib density portion 42 becomes apparent when the relationship between the average pitch interval (b) of the ribs of the low rib density portion 41 and the average pitch interval (a) of the ribs of the high rib density portion 42 satisfies 1.2a≤b. Moreover, changing the size (diameter in the cross-sections) of the ribs (6, 7, and 15) can also change the rib density.

Figure 14A:
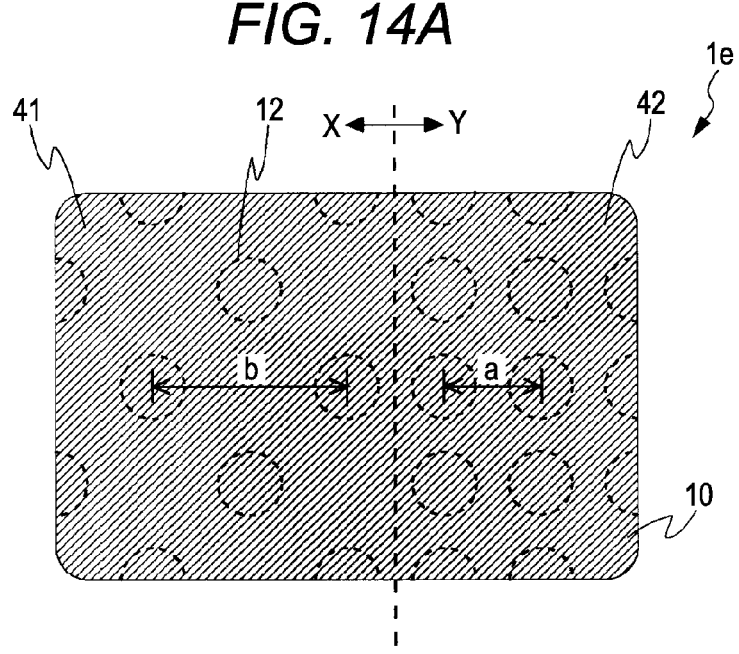
FIG. 14A is a plan view of an impact absorbing member according to a sixth embodiment.
Figure 14B:
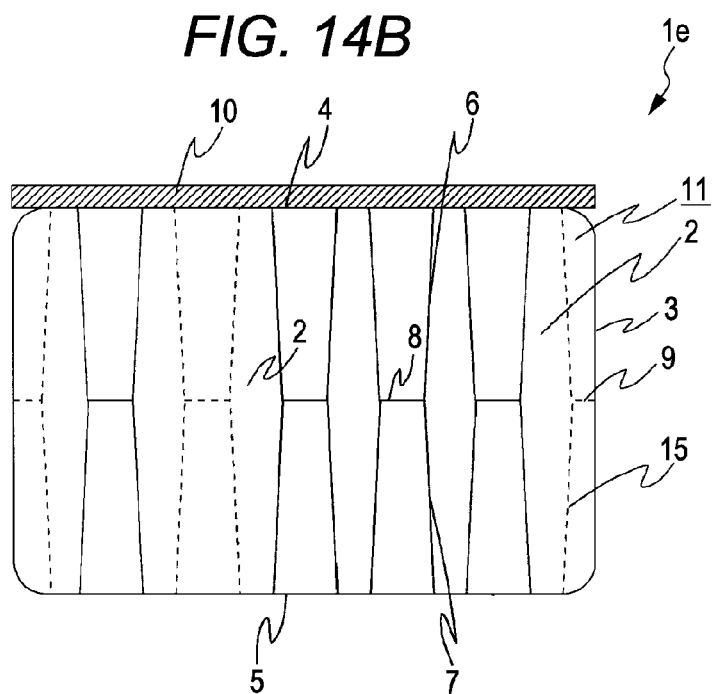
FIG. 14B is a side view of the impact absorbing member.

Therefore, the impact absorbing member 1e is provided with the plate member 10 on the impact absorbing surface of the hollow body 11 so as to cover the low rib density portion 41 and the high rib density portion 42, as illustrated in FIGS. 14A and 14B. Thus, if impact is imparted to a part of the plate member 10, the impact is substantially uniformly dispersed over substantially the entire surface of the plate member 10. Consequently, it is possible to make the amounts of strain of both the low rib density portion 41 and the high rib density portion 42, not only the portion that has received impact (e.g., the low rib density portion 41), almost equal. As a result, the low rib density portion 41 and the high rib density portion 42 can be strained almost uniformly. Therefore, the impact absorbing member 1e can absorb impact effectively.

Figure 15A:
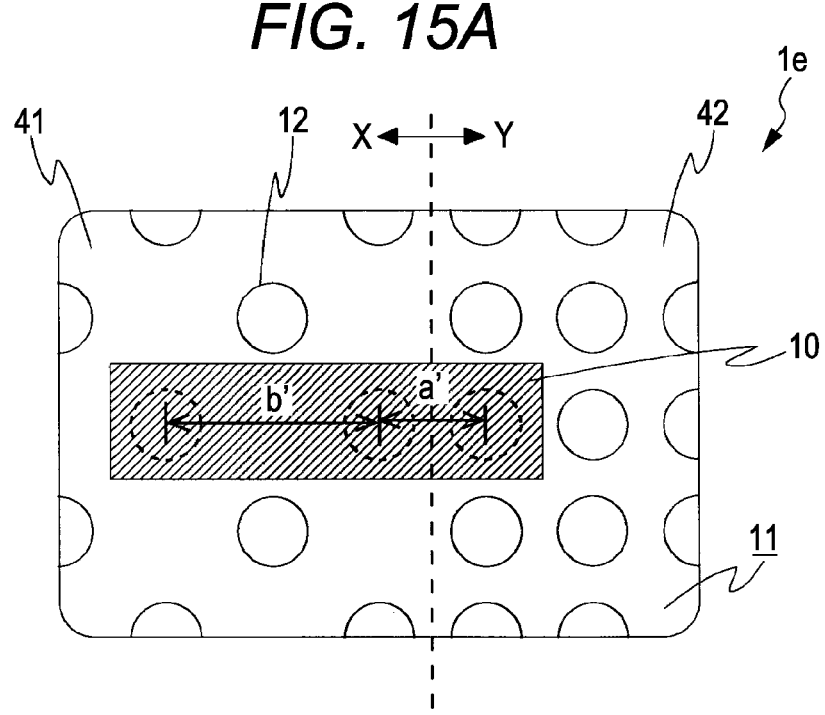
FIG. 15A is a plan view of the impact absorbing member.
Figure 15B:
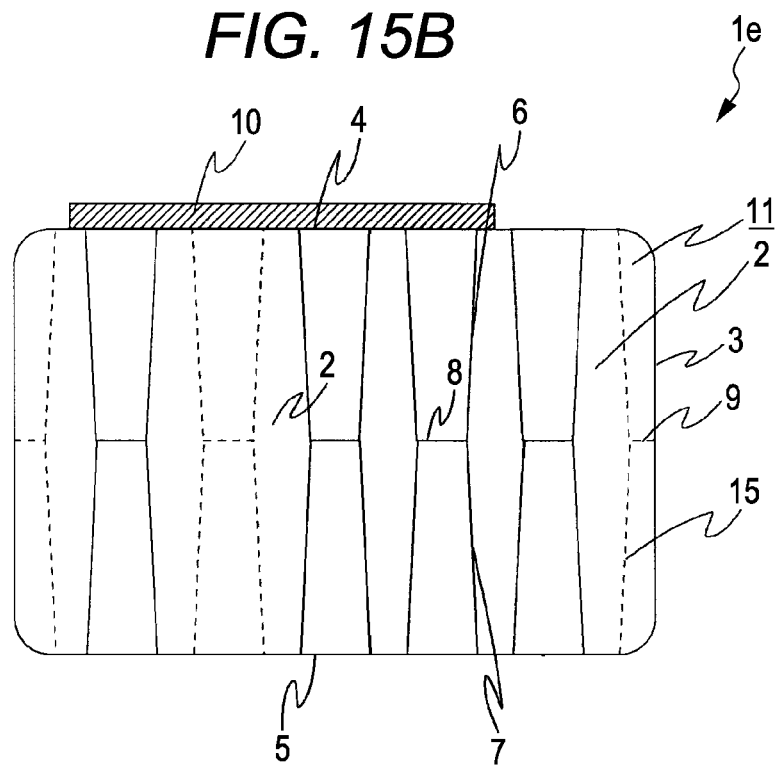
FIG. 15B is a side view of the impact absorbing member.

In FIGS. 14A and 14B, the plate member 10 is provided on the impact absorbing surface so as to cover the low rib density portion 41 and the high rib density portion 42 in the hollow body 11. However, the plate member 10 may cover at least a part of the low rib density portion 41 and at least a part of the high rib density portion 42 as illustrated in FIGS. 15A and 15B. Also with this configuration, effect almost similar to that of the configuration illustrated in FIGS. 14A and 14B can be obtained.

In FIGS. 15A and 15B, the relationship between an average pitch interval (b') of the ribs of the low rib density portion 41 and an average pitch interval (a') of the ribs of the high rib density portion 42 may satisfy 1.2a'≤b. As illustrated in FIGS. 15A and 15B, the plate member 10 may be provided so as to cover at least one rib in the low rib density portion 41 and at least one rib in the high rib density portion 42. In this case, the impact absorbing member 1e can absorb impact effectively.

Moreover, the stiffness of the low rib density portion 41 and the stiffness of the high rib density portion 42 may be made almost equal.

Figure 16A:
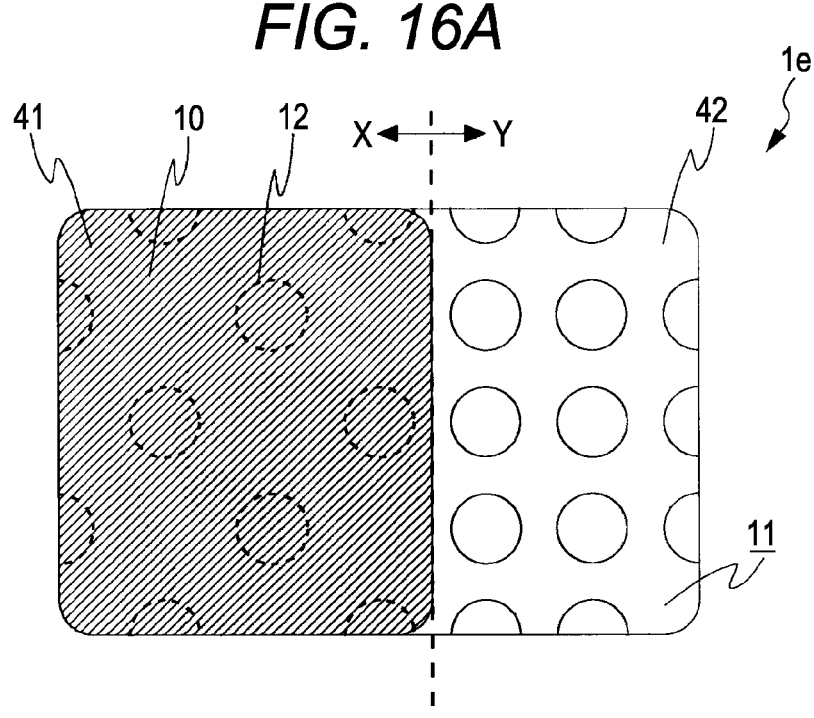
FIG. 16A is a plan view of the impact absorbing member.
Figure 16B:
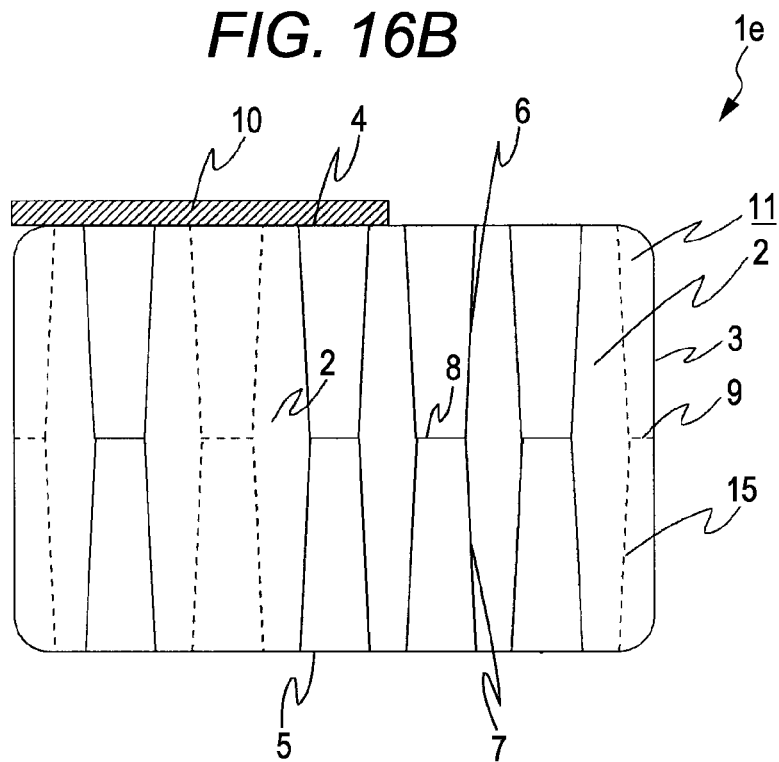
FIG. 16B is a side view of the impact absorbing member.

Therefore, the impact absorbing member 1e is provided with the plate member 10 on the impact absorbing surface so as to cover the low rib density portion 41, as illustrated in FIGS. 16A and 16B. Consequently, the stiffness of the low rib density portion 41 is increased by the plate member 10. Consequently, the stiffness of the low rib density portion 41 approaches the stiffness of the high rib density portion 42. As a result, it is possible to promote the balance of the stiffness between the low rib density portion 41 and the high rib density portion 42 even if there is restriction on the arrangement of the ribs, and the like in the impact absorbing member 1e.

A plurality of small plate members 10 may be provided on the impact absorbing surface of the hollow body 11. In this case, it is preferable that each plate member 10 cover at least two or more ribs 6, 7, and 15. Thus, substantially all the ribs covered by the plate member 10 absorb impact. Consequently, impact is absorbed effectively.

Moreover, the plate member 10 may be provided not only on the impact absorbing surface of the hollow body 11 but also on the surface facing the impact absorbing surface. Moreover, the plate member 10 may be provided on the side surface (the surface on the peripheral wall surface 3 side). Consequently, it is possible to increase the impact resistance of the impact absorbing member 1e (the hollow body 11) to impact from the side. Consequently, it is possible to further increase the stiffness of the impact absorbing member 1e.

Moreover, in the configuration illustrated in FIGS. 16A and 16B, the plate member 10 of a single plate is provided on the impact absorbing surface of the hollow body 11 so as to cover the low rib density portion 41. In this configuration, the stiffness of the low rib density portion 41 is increased by the plate member 10 of a single plate. However, as illustrated in FIGS. 14A, 14B, 15A, and 15B, the plate member 10 of a single plate may be provided so as to cover both the low rib density portion 41 and the high rib density portion 42. While the portion of the plate member 10, which covers the low rib density portion 41, may be made thick, the portion covering the high rib density portion 42 may be made thin. In this case, while the stiffness of the low rib density portion 41 is increased, the stiffness of the high rib density portion 42 is not increased so much. In this manner, in the impact absorbing member 1e, the thickness (or the material) of the plate member 10 may be partially changed. Consequently, it becomes possible to partially adjust the stiffness of the impact absorbing member 1e (the hollow body 11).

A method of manufacturing the impact absorbing member 1e is different from the above-mentioned method of manufacturing the impact absorbing member 1b according to the third embodiment in that a mold block with a different shape is used. Except for this point, it is possible to manufacture the impact absorbing member 1e similarly to the impact absorbing member 1b.

<Operation and Effect of Impact Absorbing Member 1e>

In this manner, in the impact absorbing member 1e, the hollow body 11 includes the low rib density portion 41 and the high rib density portion 42. As illustrated in FIGS. 14A, 14B, 15A, and 15B, the impact absorbing member 1e is provided with the plate member 10 on the impact absorbing surface of the hollow body 11 so as to cover at least a part of the low rib density portion 41 and at least a part of the high rib density portion 42. Consequently, if impact is imparted to a part of the plate member 10, the impact is substantially uniformly dispersed over substantially the entire surface of the plate member 10. Therefore, not only the portion that has received the impact (e.g., the low rib density portion 41), but also both the low rib density portion 41 and the high rib density portion 42, which are covered by the plate member 10, are strained with almost the equal amount of strain. Accordingly, even if the hollow body 11 includes the low rib density portion 41 and the high rib density portion 42 due to restriction on the arrangement of the ribs, and the like in the impact absorbing member 1e, the impact absorbing member 1e can absorb impact effectively.

Moreover, the impact absorbing member 1e including the low rib density portion 41 and the high rib density portion 42 may be provided with the plate member 10 on the impact absorbing surface so as to cover the low rib density portion 41, as illustrated in FIGS. 16A and 16B. Consequently, the stiffness of the low rib density portion 41 can be increased by the plate member 10. As a result, it is possible to promote the balance of the stiffness between the low rib density portion 41 and the high rib density portion 42. Even with this configuration, substantially all the ribs covered by the plate member 10 absorb impact. Therefore, the impact absorbing member 1e can absorb impact effectively.

The impact absorbing members 1b, 1c, 1d, and 1e are preferred embodiments. The scope of the present disclosure is not limited to the impact absorbing members 1b, 1c, 1d, and 1e. The present disclosure can be carried out in modes where various alterations are made unless they depart from the gist thereof.

Figure 17:
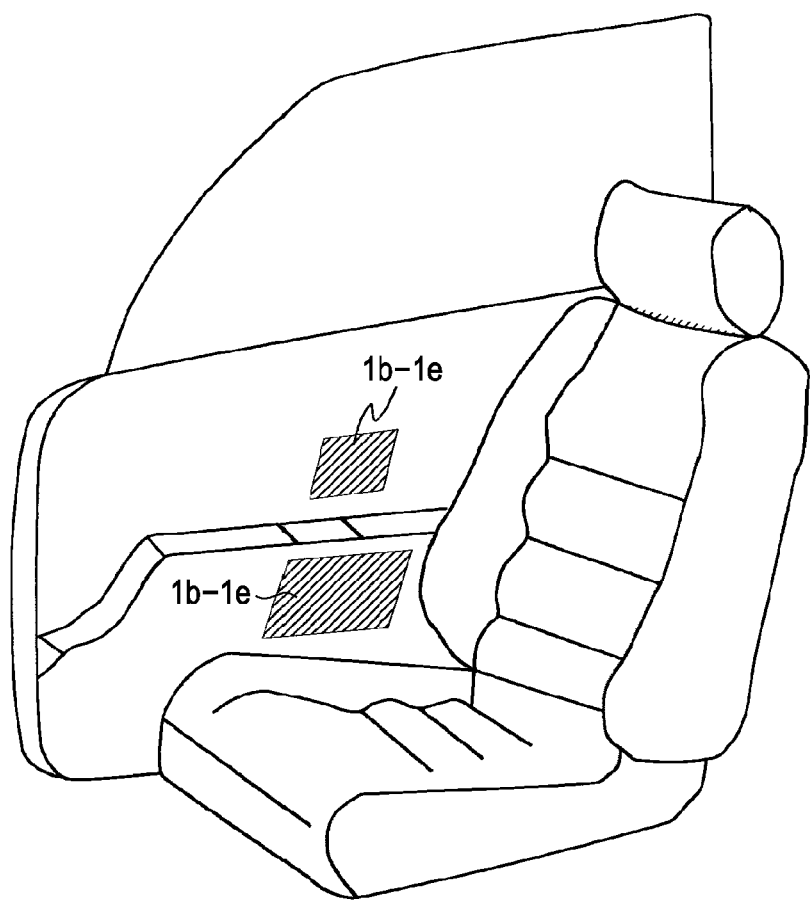
FIG. 17 is a view for explaining an example of a place to install the impact absorbing member according to the third to sixth embodiments.
Figure 18:
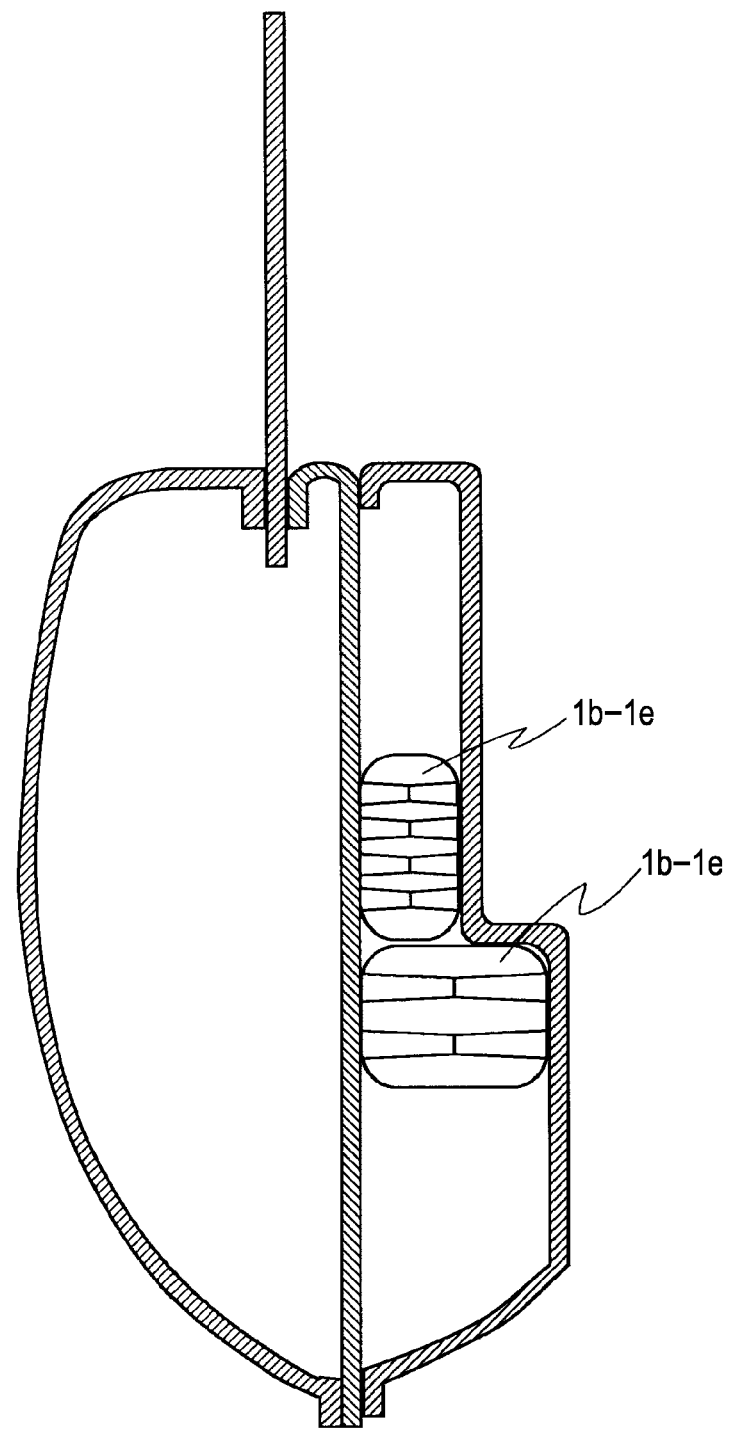
FIG. 18 is a cross-sectional view of a door trim provided therein with the impact absorbing member according to the third to sixth embodiment.

For example, as illustrated in FIGS. 17 and 18, the impact absorbing members 1b, 1c, 1d, and 1e (1b to 1e) can be provided between a door panel and a door trim to protect an occupant from impact from the side. In this case, the position to install the impact absorbing members 1b to 1e is determined considering the collision position of the occupant. The collision position is a position where the waist and/or the chest of the occupant hits against the door trim, for example, when impact is imparted to the side of an automobile. Consequently, it is possible to protect the occupant effectively.

Moreover, the impact absorbing members 1b to 1e can be provided inside vehicle components such as a body side panel, a roof panel, a pillar, and a bumper of an automobile and the like. Moreover, it is also possible to use the impact absorbing members 1b to 1e for equipment other than an automobile. It is also possible to use the impact absorbing members 1b to 1e for transport such as a train, a ship, and an airplane.

Moreover, the impact absorbing member 1 according to the first embodiment is not necessarily required to be welded at the center, and may be welded, for example, to the wall surfaces of the first wall 4 and the second wall 5.

Figure 4A:
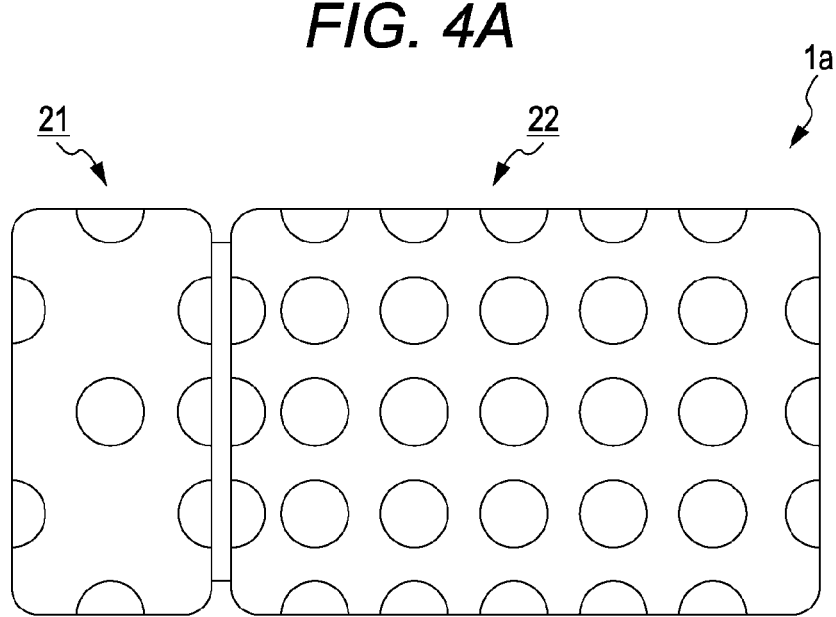
FIG. 4A is a plan view of an impact absorbing member according to a second embodiment.
Figure 4B:
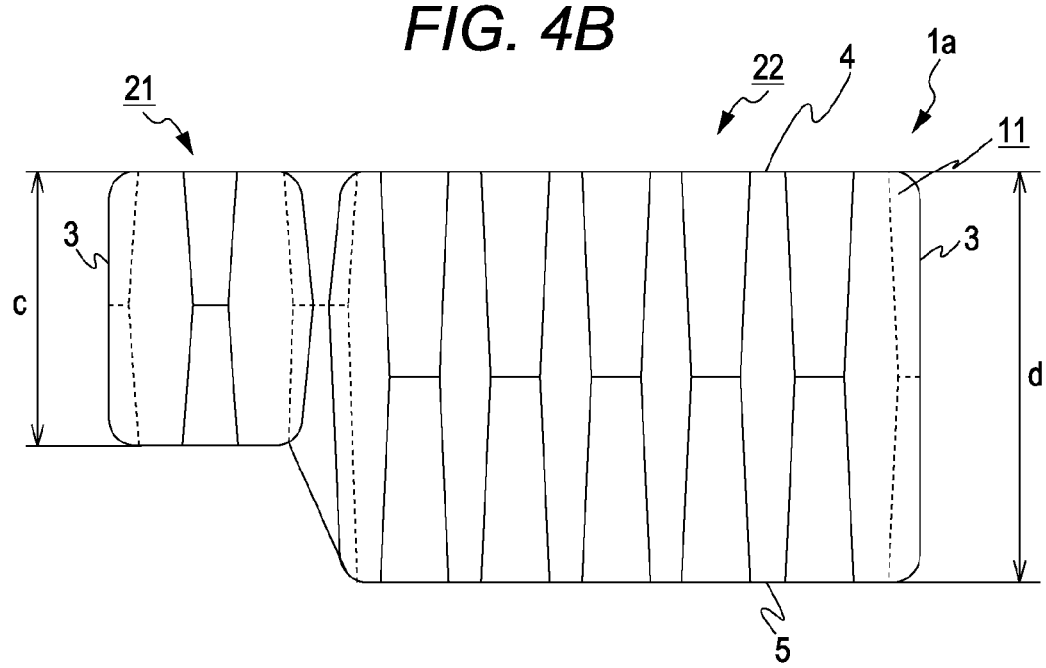
FIG. 4B is a side view of the impact absorbing member.

Moreover, as illustrated in FIGS. 4A and 4B, in the impact absorbing member 1a according to the second embodiment, the rib density and the thickness of the hollow body 11 are controlled to apparently change the impact absorbing performance of different areas. In other words, in the impact absorbing member 1a, the rib density and the total thickness are controlled; therefore, it is possible to obtain desired stiffness in each area. Furthermore, it is possible to make the impact absorbing performance of both areas apparently different from each other based on difference in falling manners of the ribs due to difference in the rib density.

Moreover, the plate member 10 of the impact absorbing member 1b receives impact on a plane and disperses the impact uniformly over the plurality of ribs 6, 7, and 15. Therefore, the plate member 10 is provided so as to straddle at least two or more ribs 6, 7, and 15.

Moreover, as illustrated in FIGS. 15A and 15B, impact can be absorbed more effectively if the plate member 10 is provided so as to straddle at least two or more ribs in each of the portions 41 and 42 of the low rib density portion 41 in the hollow body 11 and the high rib density portion 42 in the hollow body 11.

Moreover, the methods of manufacturing the impact absorbing member according to the present disclosure may be the following first and second manufacturing methods.

The first manufacturing method includes: disposing parison between a pair of split mold blocks each having a rib forming cavity that forms a plurality of ribs; then clamping the mold blocks; and subsequently introducing pressurized air to fit the parison along the cavities of the mold blocks and form a hollow body having the plurality of ribs as well as subsequently cooling the parison to form a low density portion and a high density portion for the plurality of ribs.

The second manufacturing method includes the steps of: placing a plate member having partially different thickness on a cavity surface of one of a pair of split mold blocks so that an exposed surface thereof is horizontal; disposing parison between the other split mold block having the cavity surface that forms a plurality of ribs, and the one split mold block; clamping the split mold blocks; and introducing pressurized air to fit the parison along the cavity surface and form a hollow body having the plurality of ribs as well as welding the plate member to the hollow body, straddling at least two or more ribs.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An impact absorbing member comprising a hollow body having a plurality of ribs, wherein
    the hollow body includes a low rib density portion being a portion where density of the ribs is low and a high rib density portion being a portion where density of the ribs is high,
    the hollow body has a first wall and a second wall,
    the plurality of the ribs include a pair of recessed ribs including first and second recessed ribs, each with an opening end and another end,
    the opening end of the first recessed rib is provided at the first wall of the hollow body, and the opening end of the second recessed rib is provided at the second wall of the hollow body,
    each of the first and second recessed ribs has a substantially cylindrical wall having a substantially circular cross-section, and has an inner diameter decreasing from the opening end toward the another end,
    the another end of the first recessed rib and the another end of the second recessed rib are welded to each other to form a welded plate-shaped portion,
    the hollow body includes thin and thick portions, each having the pair of the recessed ribs, and
    the rib density of the thin portion and the rib density of the thick portion are different from each other.

2. The impact absorbing member according to claim 1, wherein
    a thickness "c" of the thin portion and a thickness "d" of the thick portion satisfy $1.3c \leq d$.

3. The impact absorbing member according to claim 1, wherein an average pitch interval "b" of the ribs in the low rib density portion and an average pitch interval "a" of the ribs in the high rib density portion satisfy $1.2a \leq b$.

4. The impact absorbing member according to claim 1, wherein
    the pair of the recessed ribs are symmetrical in shape from the another ends towards the opening ends of the recessed ribs.

* * * * *